(12) United States Patent
Kobayashi

(10) Patent No.: US 7,413,180 B2
(45) Date of Patent: Aug. 19, 2008

(54) SHEET FINISHING APPARATUS AND IMAGE FORMING APPARATUS EQUIPPED WITH THE SAME

(75) Inventor: Misao Kobayashi, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 310 days.

(21) Appl. No.: 11/196,674

(22) Filed: Aug. 4, 2005

(65) Prior Publication Data
US 2006/0033256 A1 Feb. 16, 2006

(30) Foreign Application Priority Data

| Aug. 6, 2004 | (JP) | ............... 2004-230232 |
| Aug. 6, 2004 | (JP) | ............... 2004-230233 |
| Aug. 6, 2004 | (JP) | ............... 2004-230234 |
| Aug. 6, 2004 | (JP) | ............... 2004-230235 |

(51) Int. Cl.
*B65H 37/04* (2006.01)

(52) U.S. Cl. ............. 270/58.12; 270/58.07; 270/58.08; 270/58.18

(58) Field of Classification Search ............. 270/58.07, 270/58.08, 58.12, 58.18
See application file for complete search history.

(56) References Cited

U.S. PATENT DOCUMENTS

| 5,120,047 | A * | 6/1992 | Mandel et al. ............... 271/220 |
| 5,129,640 | A * | 7/1992 | Kosaka et al. ................ 270/37 |
| 6,330,999 | B2 * | 12/2001 | Coombs et al. ........... 270/58.18 |
| 6,382,615 | B1 * | 5/2002 | Ishiguro et al. ........... 270/58.12 |
| 6,450,934 | B1 * | 9/2002 | Coombs ..................... 493/383 |
| 6,641,129 | B2 * | 11/2003 | Ogita et al. ............... 270/58.08 |
| 6,685,180 | B2 | 2/2004 | Saegusa et al. |
| 6,722,646 | B2 * | 4/2004 | Sekiyama et al. ........ 270/58.09 |
| 6,776,404 | B1 * | 8/2004 | Milillo et al. ............. 270/58.18 |
| 6,886,828 | B2 * | 5/2005 | Saito .......................... 271/225 |
| 2002/0050675 | A1 * | 5/2002 | Saegusa et al. ........... 270/58.08 |
| 2003/0016401 | A1 | 1/2003 | Saito |
| 2003/0137102 | A1 * | 7/2003 | Saito .......................... 271/306 |

FOREIGN PATENT DOCUMENTS

| JP | 2002-060123 | 2/2002 |
| JP | 2003-020156 | 1/2003 |

* cited by examiner

*Primary Examiner*—Gene O. Crawford
*Assistant Examiner*—Leslie A Nicholson, III
(74) *Attorney, Agent, or Firm*—Manabu Kanesaka

(57) ABSTRACT

A sheet finishing apparatus includes a tray device for sequentially stacking and storing a sheet, a corner support device arranged between a discharge outlet and the tray device for supporting a corner of the sheet, and a finishing device for finishing the sheet on the corner support device. A first support device supports the corner support device to move between an operating position positioned in a sheet conveying path and a retracted position retracted from the operating position. A second support device supports the finishing device. The second support device is formed separately from the first support device and moves the finishing device between an operating position in the sheet conveying path to a retracted position retracted from the operating position. A drive device moves the first support device and the second support device from the operating positions to the retracted positions after finishing the sheet with the finishing device.

19 Claims, 33 Drawing Sheets

Auxiliary View A

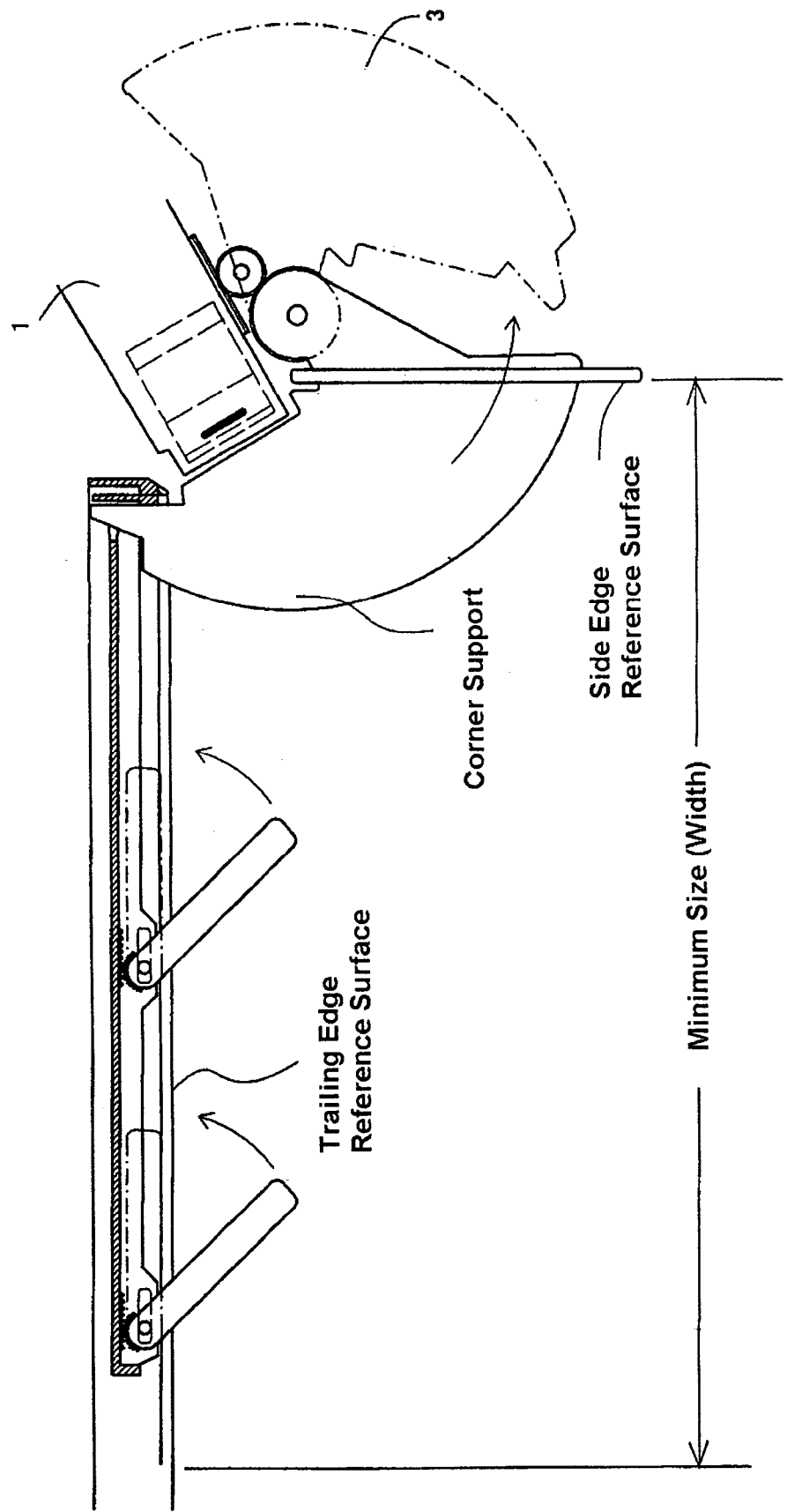

Auxiliary View A

Auxiliary View A

Auxiliary View A

SHEET FINISHING APPARATUS AND IMAGE FORMING APPARATUS EQUIPPED WITH THE SAME

BACKGROUND OF THE INVENTION AND RELATED ART STATEMENT

1. Field of the Invention

The present invention mainly relates to a sheet finishing apparatus for finishing (such as stapling, punching holes, or applying stamps) sheets discharged from an image forming apparatus such as a printer, a printing press, or a copier, and more particularly to a structure for a smaller and more compact finishing mechanism.

2. Description of the Prior Art

Generally, that kind of finishing apparatus is mounted to a printing device such as a printer or a copier, and is widely used for finishing sheets formed with images. A variety of methods for finishing a series of documents after being formed with images are well known in the art. Available are function units that staple documents, punch a hole therein, or even apply a stamp thereupon. These function units are arranged at a sheet discharge outlet. There is an apparatus that temporarily discharges sheets sequentially conveyed to a tray (an interim tray) for processing. After finishing a stack of sheets on the tray, the apparatus moves the stack of sheets or documents to a different tray for stacking. Another variety of such an apparatus finishes sheets in a path leading from a sheet discharge outlet to a stacking tray. The former type of apparatus is applied as a large, high-function apparatus. The latter type is used as a compact and low-cost apparatus. The present invention relates to the latter type, namely a compact and low-cost apparatus. The invention can easily be built into devices such as printers and copiers. The finishing apparatus is also configured to be smaller and more compact to be equipped at a discharge outlet of such printing or copying devices.

Japanese patents Tokkai 2003-20156 (U.S. publication US 2003/0016401 A1) and Tokkai 2002-60123 (U.S. Pat. No. 6,685,180 B1) disclose arranging a finishing unit, such as a stapler, between the discharge outlet of a device, such as a printer, and a stacking tray. Japanese patent Tokkai 2003-20156 discloses disposing a step-shaped corner support unit in a mid-position of a sheet discharged from a discharge outlet to a stacking tray. There, a series of documents (or a sheet bundle) is stapled using a stapling unit arranged at this corner support unit. Disclosed in this publication is a configuration wherein individual sheet conveyed from a discharge outlet is stacked overlapping the corner support unit and the stacking tray. The series of documents are thus stapled in that stacked state. Then, the document bundle is pushed to the top of the stacking tray where each sheet bundle is finally accumulated.

The structure arranges a member for supporting sheets on the corner over a stacking tray, and a stapling unit, and then pushes stapled sheets into a stacking tray. However, in the operation, either sheets are sequentially conveyed out from the corner support portion into a discharge tray when not finishing sheets such as by stapling them, or switching the operations for finishing by discharging offsetting sheets in the discharge outlets in a direction traversing the direction of sheet conveyance in the transport vans path and discharging them to the corner support portion and an operation for discharging sheets to a tray away from the corner support portion is necessary. Therefore, such an apparatus requires a larger stacking tray for sheets in a width direction to accommodate sheet bundle offset amounts and a mechanism for offsetting sheets.

Japanese laid-open patent 2002-60123 discloses a system for supporting the trailing edge of sheets discharged from a discharge outlet with a leading edge of a sheet stacked in a stacking tray. Disclosed are a sheet edge support member and a stapling unit for binding side edges of a sheet bundle, the trailing edge thereof supported by that support member. In this publication, after finishing a sheet bundle, such as by stapling, the sheet bundle is pushed into a stacking tray. Simultaneously, the sheet support portion rotates in a sheet accumulation direction to stack the sheet bundle in the stacking tray.

The sheet bundle is held for finishing while sheets discharged from the discharge outlet bridge between the stacking tray and the support member. After finishing is completed, the sheet bundle is stacked in the stacking tray. This enables a comparatively smaller and more compact apparatus structure. However, as an image forming apparatus, such as printer, is recently becoming smaller, there is also a demand for automated finishing for binding that is performed simultaneously to image forming. There is also a demand for wider discharge stackers than is necessary. Such a wide stacker, including the outer casing, is actually a demerit for a compact apparatus. The conventional apparatus described above has a more complex structure for offset movements of sheets discharged by discharge rollers in a direction traversing the sheet conveyance direction. There is also the problem of an inability to offset sheets with good aligning, so there is a problem of sheets being disorganized at the finishing process. After finishing a sheet bundle stacked in a stacking tray, the sheet bundle is moved in a horizontal direction over a sheet bundle already stacked. This causes the stack to collapse.

OBJECT OF THE INVENTION

Thus, in view of the problems associated with the prior art, the first object of the present invention is to provide a mechanism for finishing sheets that advances and retracts over a stacking tray, and enable a smaller and more compact apparatus.

A second object of the present invention is to provide a configuration that allows for a more compact structure for advancing and retracting a support member for supporting sheets for finishing, and a finishing unit above a stacking tray, performed by a simplified drive mechanism. At the same time, the configuration makes the maintenance of the finishing unit easier.

A third object of the present invention is to provide a finishing apparatus that improves the alignment of sheets for finishing, and stacks finished sheets neatly in a stacking tray, and an image forming apparatus equipped with such a finishing apparatus.

All other objects and features of this invention will be clarified with a description of the following embodiment based on the drawings provided.

SUMMARY OF THE INVENTION

The present invention employs the following configuration to attain the objects described above.

The apparatus has tray means arranged below a discharge outlet for sequentially stacking and storing sheets; corner support means arranged between the discharge outlet and the tray means for placing and supporting a corner of sheets; finishing means for finishing sheets on the corner support means; a first support means for supporting the corner support means to be movable from an operating position positioned in a conveying path of a sheet from the discharge outlet to the tray means; and a second support means for supporting the finishing means. Drive means are disposed for the first support means and the second support means for moving from an operating position after sheet finishing to a retracted position.

The discharge outlet and the corner support means are arranged in up and down directions to form a height level difference. The corner support means and the finishing means are movable between an operating position and a retracted position within a plane substantial parallel and forming a level difference to a plane for sheet conveyance from the discharge outlet. The first support means has an operating position and a retracted position for the corner support means to move in a direction substantially orthogonal to a sheet discharge direction from the discharge outlet.

The corner support means is composed of a plate-shaped member for supporting a corner of sheets. This plate-shaped member is configured by a rotating shaft member that supports the first support means enabling the plate-shaped member to move between the operating position and the retracted position within a plane substantially parallel and formed to have a level difference to a plane for a sheet discharged from the discharge outlet. The finishing means is composed of a stapling unit having staples. The second support means is composed of guide rail members that movably support this stapling unit. The staple unit is movably supported to move in straight line between the operating position and the retracted position.

The present invention has the configuration described above. Therefore, because corner support means for supporting a corner of sheets between the discharge outlet and the tray means, and finishing means are disposed, and supported to move between the operating position above the tray and the retracted position retracted from the tray, the apparatus is smaller and more compact. These benefits are also attained by arranging these means above a stacking tray for a stapling mode for finishing sheets discharged sequentially from the discharge outlet.

The corner support means and the finishing means are configured to move between the retracted position and the operating position on a plane that is substantially parallel and forming a level difference to a sheet discharge plane. Therefore, the retracted position of the finishing means is positioned at a side portion of discharged sheets. This makes it easier to perform maintenance, such as replenishing staples, from the side portion. The corner support means is configured to revolve between the operating position and the retracted position on a plane that is substantially parallel to a plane for sheet discharge from the discharge outlet, so the support mechanism and the drive mechanism can be simplified.

In order to attain the aforementioned objects, the present invention includes a tray arranged below a discharge outlet, having a sheet side edge aligning surface and a trailing edge aligning surface; support means for placing and supporting a portion of a sheet stacked on the tray; drive means for moving the support means between an operating position positioned over the tray and a retracted position retracted from the tray; and finishing means for finishing sheets supported by the support means. The support means is composed of the sheet side edge support member disposed at a position forming a level difference between the discharge outlet and the tray, for supporting a side edge of a sheet, and trailing edge support members for supporting a trailing edge of a sheet. The side edge support member and the trailing edge support members are supported to move between an operating position and a retracted position within a plane substantially parallel and forming a level difference to a sheets on the tray. Drive means are a single drive source for moving the side edge support member and trailing edge support member between the operating position and the retracted position and configured by a drive motor.

Therefore, because the side edge support member and trailing edge support members that compose the support means move between the operating position that faces the tray within a plane that is substantially parallel to a sheet on the tray and the retracted position retracted from the tray, these means do not disturb a sheet already stacked on the tray positioned below when these support members appear and disappear thereabove. They also do not affect the rollers of the discharge outlet positioned thereabove the means. Thus, there is also no particular need to increase the size of the conveyance path from the discharge outlet to the tray. Furthermore, the drive mechanism can be simplified by interlocking to a drive transmission mechanism for the side edge support member and the trailing edge support member. This makes it possible for a smaller and more compact apparatus. The alignment of sheets for finishing is also improved.

It is thus possible to attain the effects described above even on an image forming apparatus equipped with the sheet finishing apparatus described above.

BRIEF DESCRIPTION OF THE DRAWINGS

FIG. 3(a) shows corner support means and lever members at a retracted position.

FIG. 3(b) shows the corner support means and the lever members at an operating position.

FIG. 3(c) shows an operational relationship of the corner support means and the finishing means.

FIG. 8(b) is a plan view of the apparatus depicted in FIG. 4 and shows an opened state of the trailing edge support member.

FIG. 10(a) is a plan view of the drive system; and FIG. 10(b) is a perspective view of aligning means.

DETAILED DESCRIPTION OF THE PREFERRED EMBODIMENTS

Hereunder, preferred embodiments of the present invention will be explained with reference to the accompanied drawings.

Figure 1A:
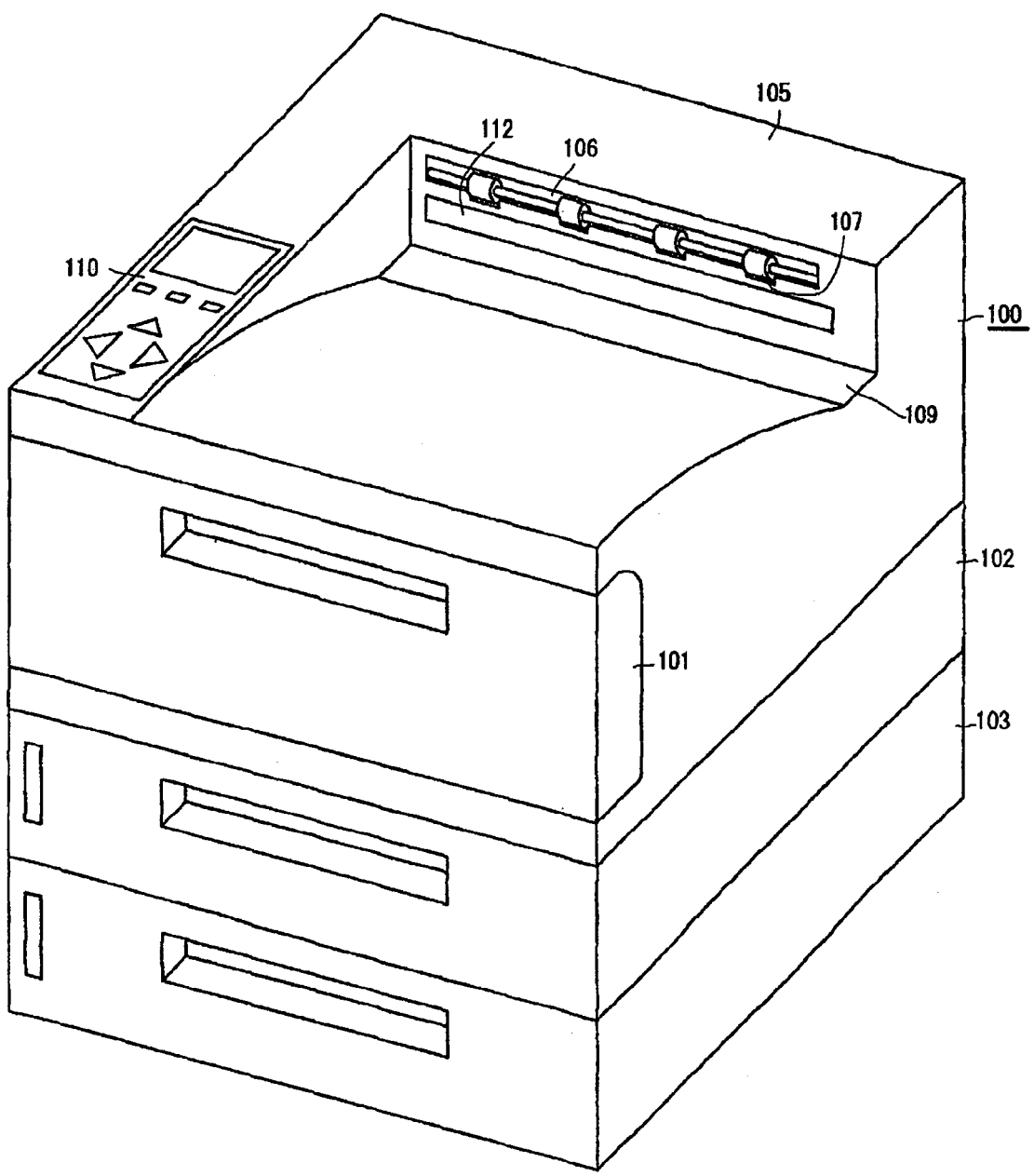
FIG. 1(a) shows a conceptual, structural view of a general image forming apparatus showing an external, perspective view of an image forming apparatus.
Figure 1B:
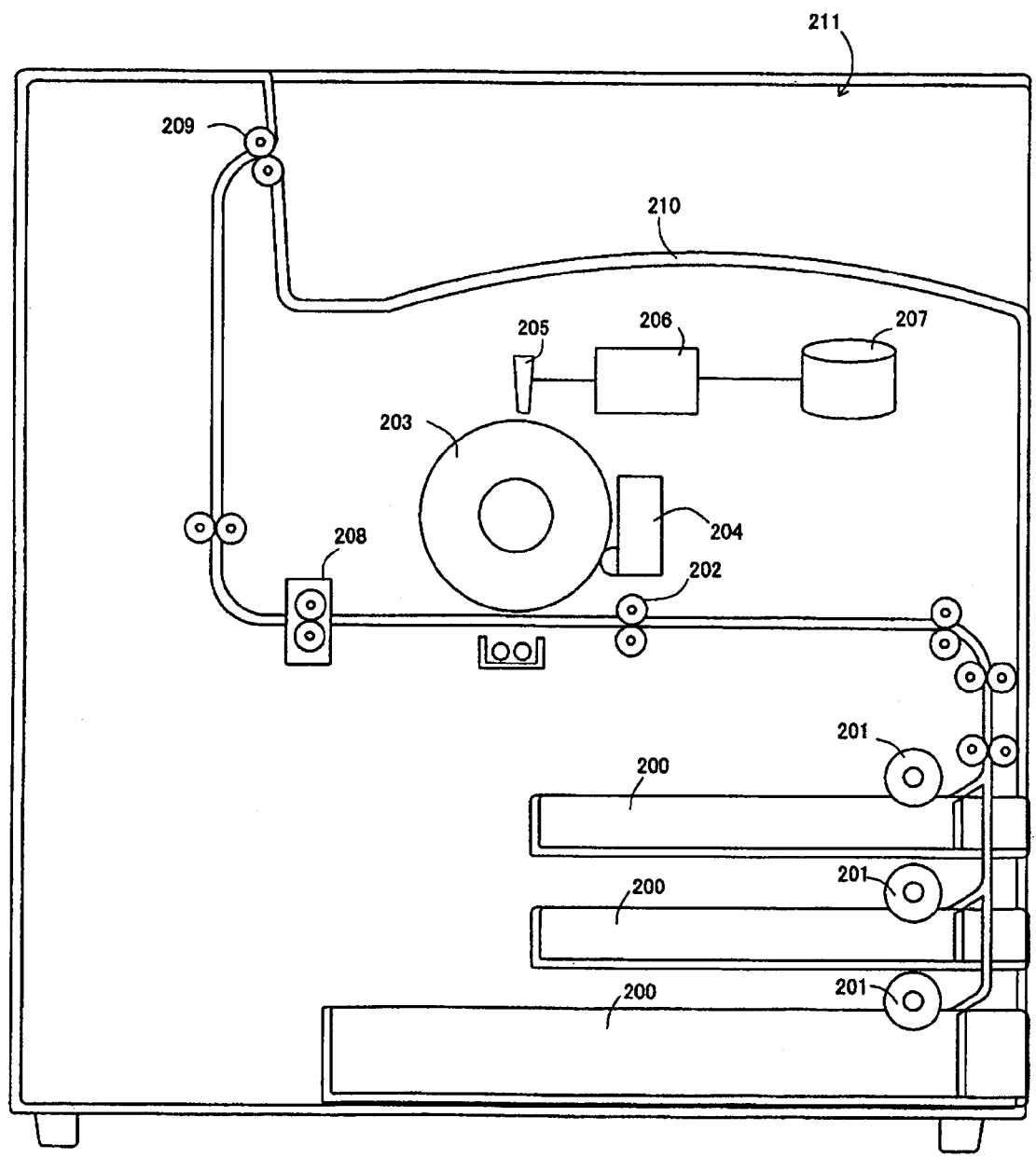
FIG. 1(b) shows a conceptual, structural view of a general image forming apparatus showing a layout of the image forming apparatus.

FIG. 1 shows a conceptual view of a general image forming apparatus. FIG. 1(a) is an external perspective of the image forming apparatus. FIG. 1(b) shows a structural layout of a laser printer as the image forming apparatus.

Shown in FIG. 1(b), an appropriate number of levels of paper cassettes 200 are disposed inside a casing in the image forming apparatus 211. Feeding rollers 201 for feeding a single sheet stored in the paper cassette 200 are equipped in the paper cassette 200. A pair of registration rollers 202 disposed in the printing unit selectively feed the various sizes of paper. The printing unit has a drum 203 for forming an electrostatic latent image; a laser head 205 for forming an image on the drum 203; a developer 204 for fixing toner ink onto the latent image on the drum 203; and a charge 212 for transferring ink on the drum 203 to a sheet. The laser head 205 is connected to an image forming unit 206 for converting image information into laser light. This image forming unit 206 is connected to a memory means 207 for images sent from a computer or a scanner device.

Therefore, in this system, a sheet is conveyed from a paper cassette 200 to the registration rollers 202. At the same time, toner ink adheres to a predetermined latent image on the drum 203. Then, the charge 212 transfers the toner ink to the sheet. After the transfer, the toner image on the sheet is thermally fixed thereto by a fixer 208. The sheet is then conveyed from discharge rollers 209 and stored in a stacking tray 210. As an image forming apparatus with this structure, any of the widely known methods of printing such as an ink jet head, a dot impact head or a silkscreen drum, can be applied to this invention.

FIG. 1(a) is a perspective view of an image forming apparatus. The paper cassette 200 is configured of paper cassettes stacked sequentially to enable expanded paper supply. Units 102 and 103 are stacked one above the other at the bottom of the printer 100. The paper cassette 200 is built-in to the printer 100. FIG. 1(a) shows a control panel 110, a stacking tray 210, and a discharge outlet 106. FIG. 1(b) shows the pair of discharge rollers 209.

Figure 2:
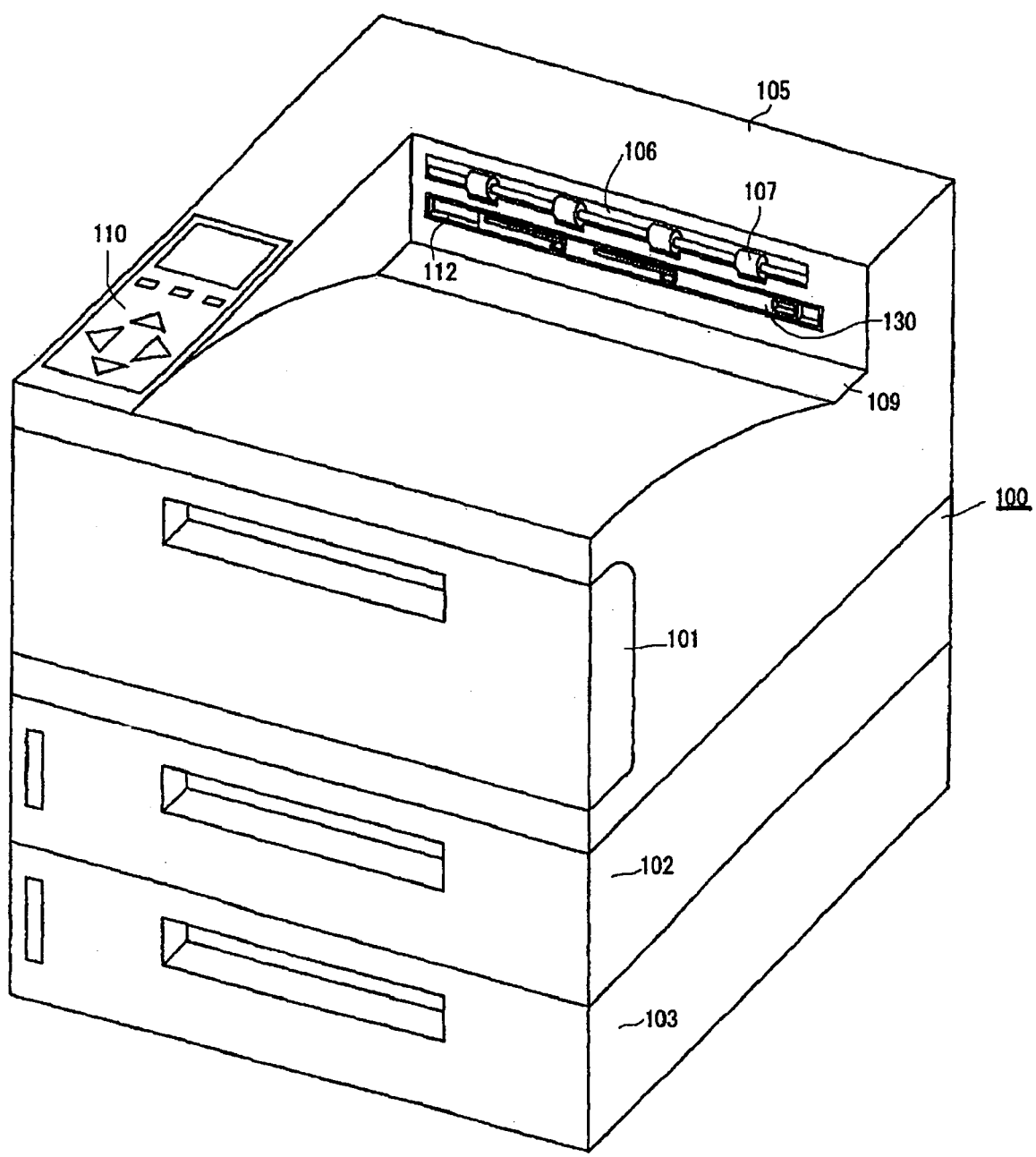
FIG. 2 is a view showing a trailing edge support member mounted to the apparatus depicted in FIG. 1.

Below will describe a structure employed for stapling or performing other finishing processes on sheets sequentially conveyed from the pair of discharge rollers 209 in the general image forming apparatus described above. The printer has corner support means 3 at a corner portion of the discharge outlet 106 for supporting a corner of a sheet at a level difference to the discharge outlet 106 and the stacking tray 210; a finishing unit 1 for finishing sheets supported by the corner support means 3; aligning means 5 for aligning sheets at a predetermined position (inclination) of the finishing unit 1; and lever members 131 for supporting a trailing edge of a sheet on the stacking tray 210. Note that FIG. 2 is a perspective view of a trailing edge reference surface 130, described below, arranged at the discharge outlet 106 of the printer described above.

Figure 3A:
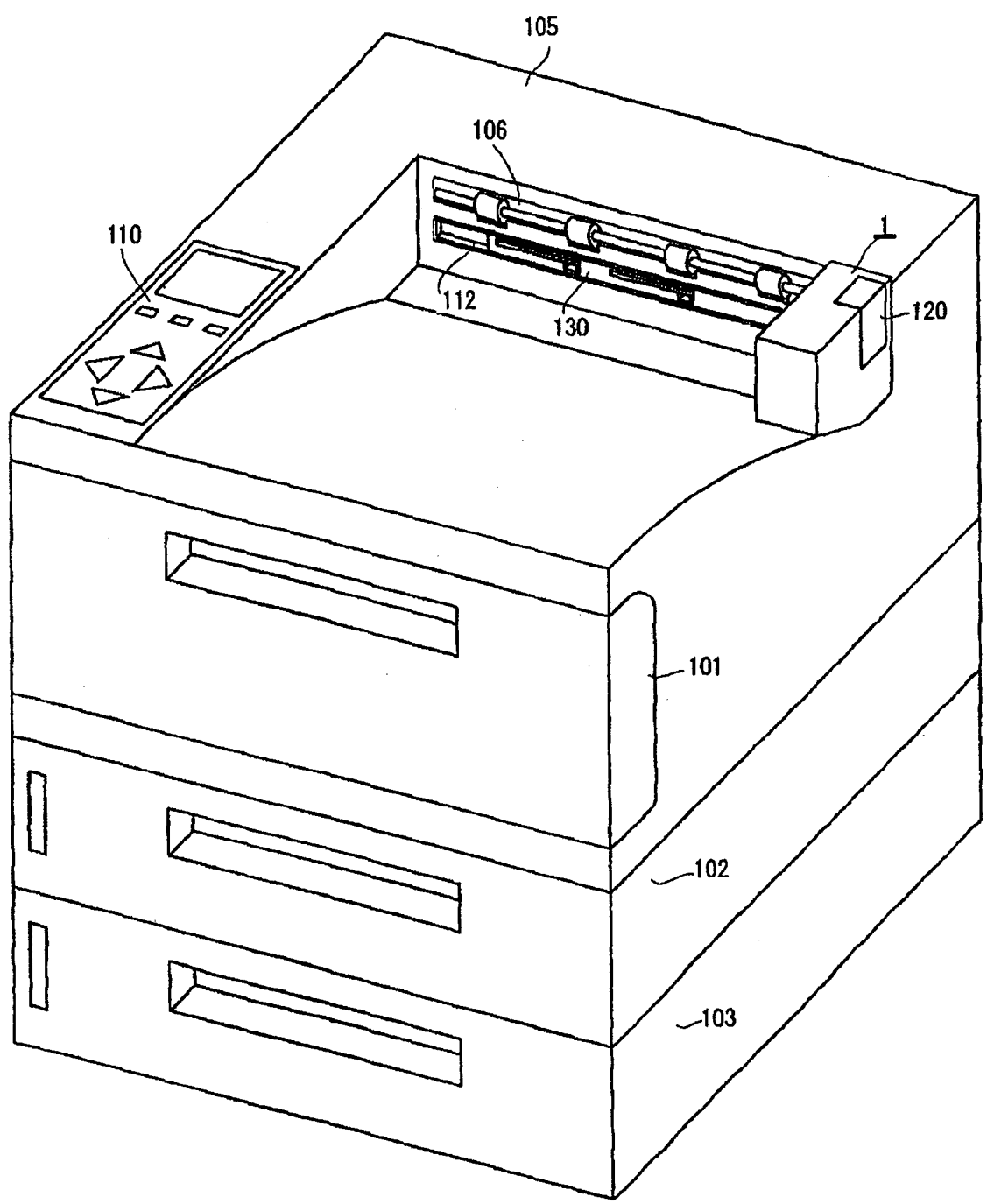
FIG. 3(a) is a view of a finishing unit mounted to the apparatus depicted in FIG. 2.
Figure 3B:
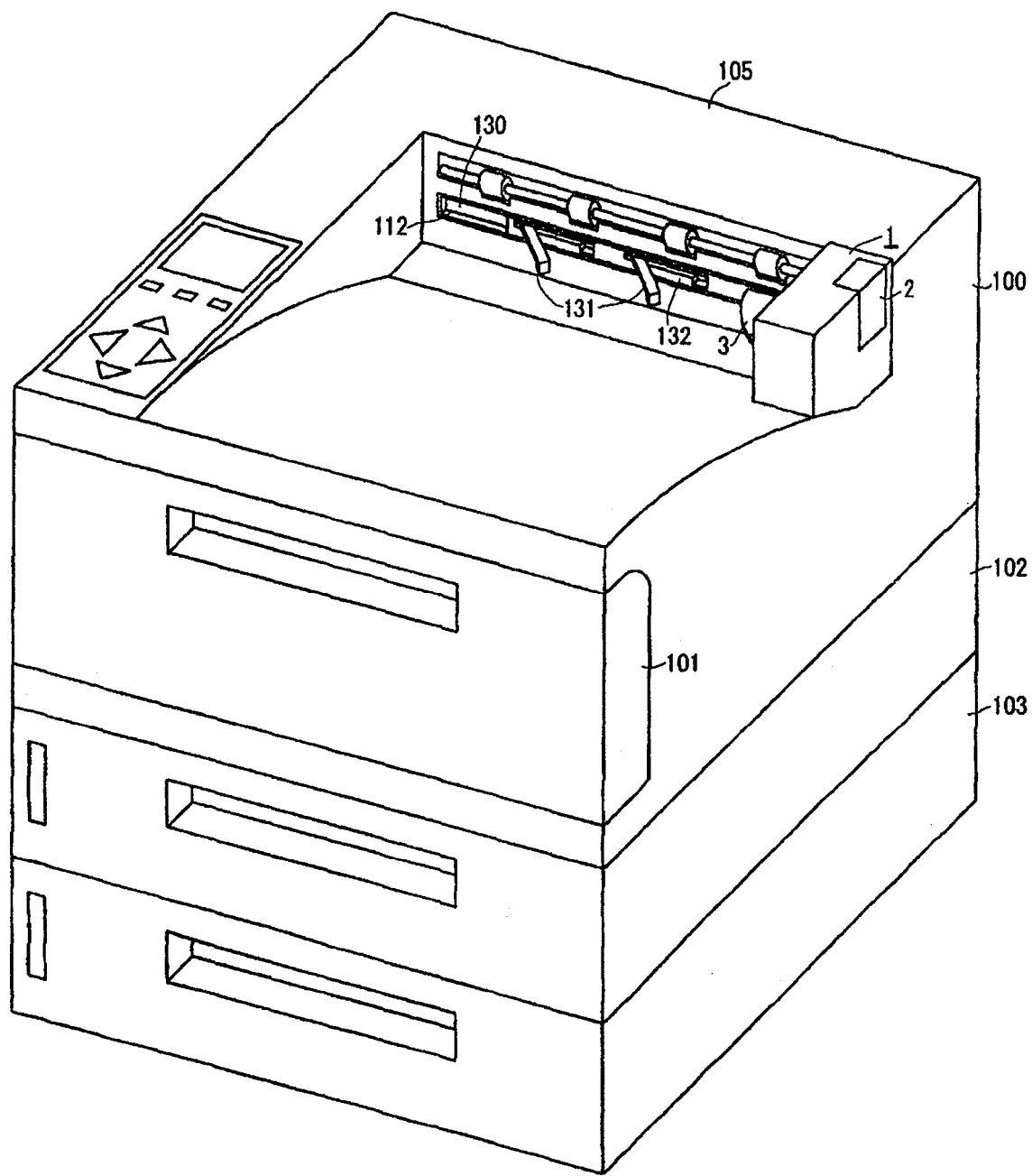
FIG. 3(b) is a view of the finishing unit mounted to the apparatus depicted in FIG. 2.
Figure 3C:
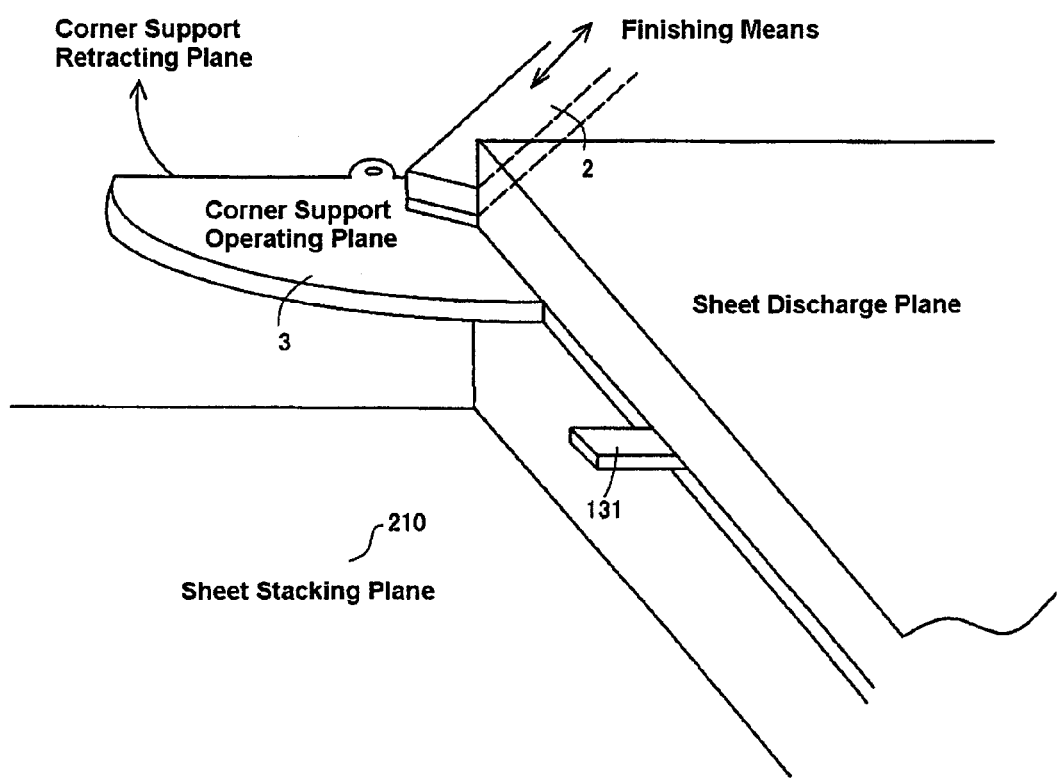
FIG. 3(c) is a view of the finishing unit mounted to the apparatus depicted in FIG. 2.

The mounting opening 112 is disposed forming a level difference to the discharge outlet 106 arranged with discharge rollers 107. Lever members 131 are arranged to appear at and disappear into the mounting opening 112. FIGS. 3(a) to 3(c) show the finishing unit 1 mounted at the discharge outlet 106. An opening cover 120 is disposed, configured by a stapler 2. This cover opens for an operator to replace staples. The stapler 2 of the structure described below, the corner support means 3 for supporting a portion of a sheet from the discharge outlet 106, and aligning means 5 for aligning a sheet on the support means at a predetermined position are built-in to the finishing unit 1. The configuration of the corner support means 3, the finishing unit 1, the aligning means 5, and the trailing edge reference surface 130 will be described in that order.

[Configuration of the Corner Support Means]

A height difference (a drop) is provided at the stacking tray 210 arranged below the discharge outlet 106 of the image forming apparatus 211. A discharged sheet falls into the tray 210 by gravity at a discharged angle and is stacked in the tray. This ensures a path for continued discharging of sheets. A sheet formed with an image is sequentially discharged from the pair of discharge rollers 209 of the discharge outlet 106 and is stacked in the tray. The tray 210 shown in the drawings is set so that different sizes of sheets are conveyed using at right side of FIG. 1(a) as a reference with a so-called single side reference wherein one side edge of a sheet is discharged at the reference.

Note that the corner support means 3 is disposed at a location that is positioned at a sheet corner of the stacking tray 210. The corner support means 3 forms a height level difference between the discharge outlet 106 and the stacking tray 210. The corner support means 3 is composed of a plate-shaped member, for example, for placing and supporting a corner of a sheet at a height position for stacking sheets.

The corner support means 3 formed by a flat, plate-shaped member, is rotatably supported by a rotating shaft 32 on a unit frame 300, described below. The corner support means 3 rotates around this rotating shaft 32. The corner support means 3 shown in the drawings arranges a semicircular, plate-shaped member near the discharge outlet, at a corner portion at a position higher than the maximum stacking amount of the stacking tray 210, and lower than the discharge outlet. A sheet support surface is formed within a plane substantially parallel to a plane of a sheet discharged from the discharge outlet 106 and the stacking plane of the stacking tray 210. The corner support means 3 is configured to move freely between an operating position (see FIG. 4) to phasingly overlap a sheet conveyance path leading from the discharge outlet 106 to the stacking tray 210, to place and to support a corner of a sheet that falls freely thereupon, and a retracted position (see FIG. 8(a)) that is phasingly retracted away from the stacking plane of the stacking tray 210.

Figure 6:
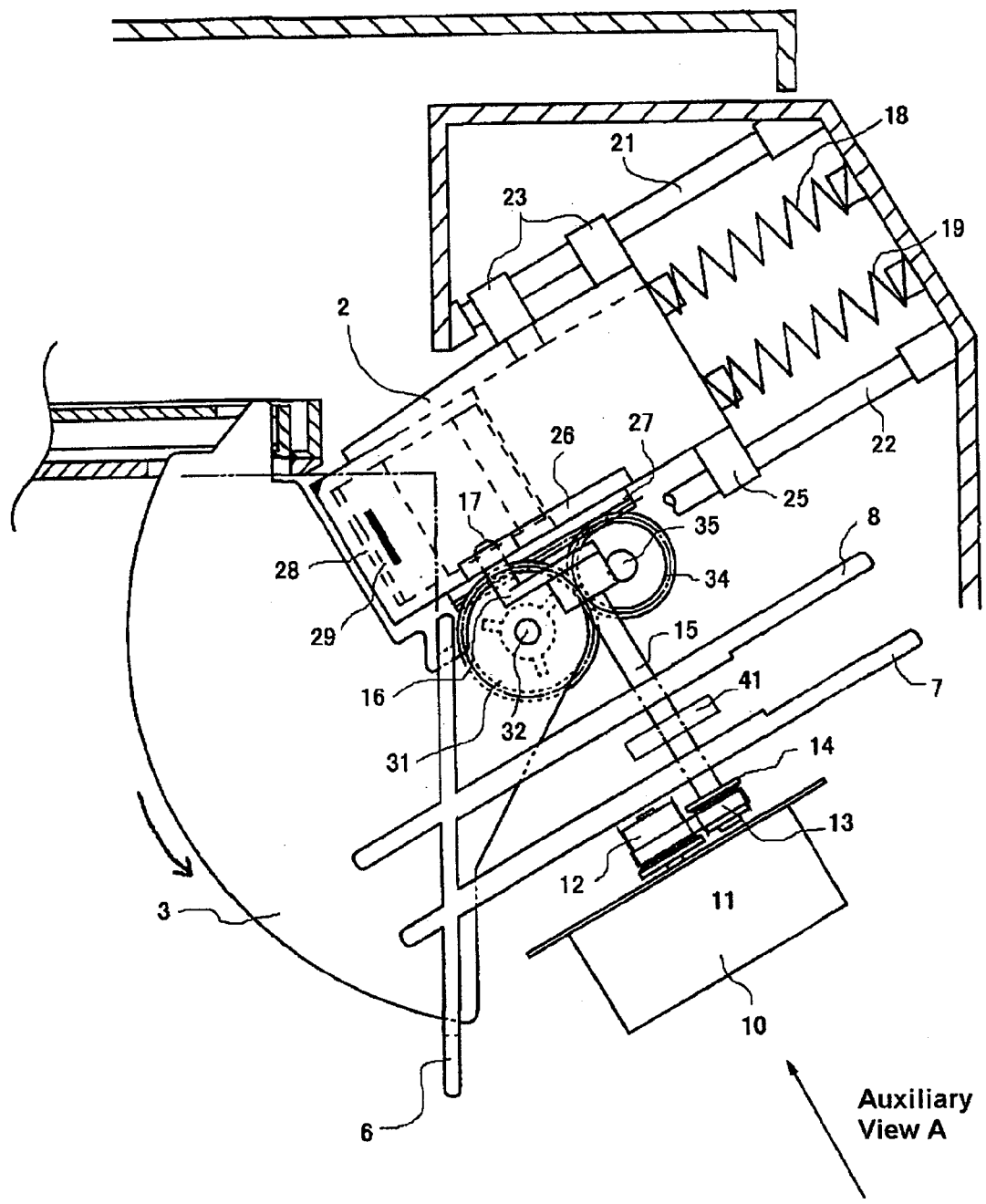
FIG. 6 is a plan view of the finishing means depicted in FIG. 4 and the corner support means at a processing position.
Figure 7:
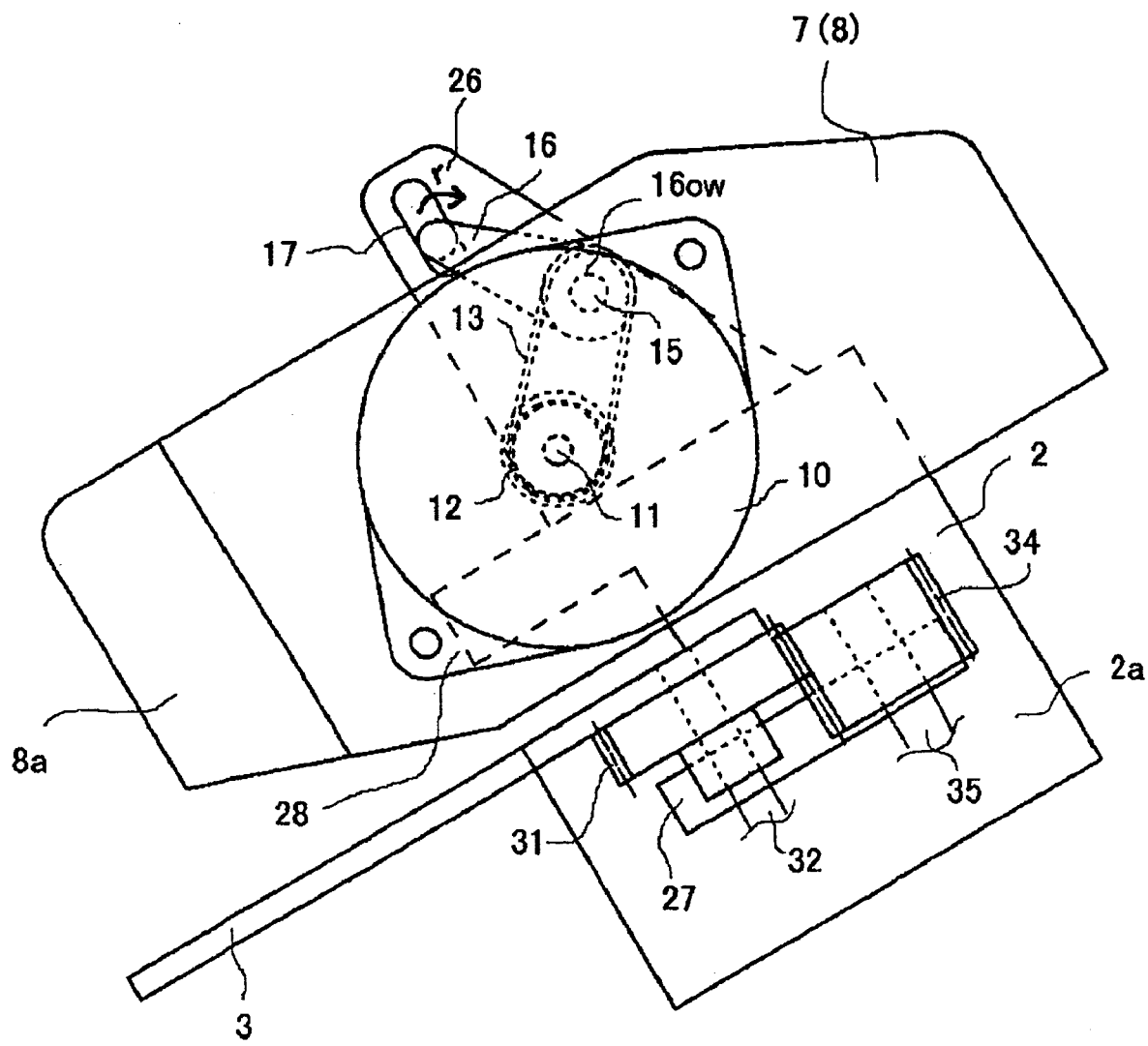
FIG. 7 is a side view of the auxiliary view A of the apparatus depicted in FIG. 6.

Therefore, the corner support means 3 is selectively positioned at the operating position positioned at a conveyance path of a sheet over the stacking tray 210 for placing and supporting a corner portion of a sheet from the discharge outlet 106, and the retracted position retracted from above the stacking tray 210. These operating and retracted positions are on a plane that is substantially parallel to the plane of a sheet discharged from the discharge outlet 106, and formed in directions substantially at right angles to a direction of sheet discharge. (See FIG. 3(c).) Because the plane of movement of the operating position and the retracted position of the corner support means 3 is substantially parallel to the plane on which a sheet discharges, and at a direction substantially at a right angle to a direction of a sheet discharge, those positions do not interfere with parts of the mechanism, such as the pair of discharge rollers 209 that discharge a sheet from the discharge outlet 106, or with sheets already stacked on the stacking tray 210. This also minimizes the amount of space necessary for movement and allows for a more compact apparatus. The stapler 2 and the corner support means 3 for supporting a corner of sheets have an operating position and retracted position within a plane substantially parallel to a plane for conveying out a sheet from the discharge outlet 106. The stapler 2 and the corner support means 3 are configured to move between those two positions. FIGS. 6 to 9 show a configuration for moving from the operating position to the retracted position. FIGS. 6 and 7 show the stapler 2 and the corner support means 3 at the operating position. Below will describe the configuration for advancing and retracting to and from the processing position and the retracted position shown in FIGS. 8(1) and 9.

The unit frame 300 incorporates a stapler 2 which is an element of the finishing mechanism; the corner support means 3 for supporting a corner of a sheet; aligning means 5, described below; and a drive mechanism of a drive motor 10 composed of a stepping motor. A wall of the unit frame 300 forms a side edge aligning surface 6, described below, and has slider frames 7 and 8. The unit frame 300 is structured as an independent unit separate to the tray 210 and mounted at the discharge outlet of the image forming apparatus as an option. Therefore, the user can select whether to mount this unit according to how the user plans to use the apparatus.

The drive motor can be mounted to the unit frame 300 as drive means for moving the stapler 2 and the corner support means 3 from the operating position to the retracted position. The motor pulley 12 is fastened to the motor shaft 11 of the drive motor 10. The motor pulley 12 and a shaft gear 14 mounted on one end of a drive shaft 15 that transmits the drive for moving the stapler 2, are linked by a transmission belt 13. The drive shaft 15 is rotatably supported on the slider frames 7 and 8 installed up right from the unit frame 300. A moving arm 16 is mounted to a position at a side opposite to the shaft gear 14 of the drive shaft 15, via the drive shaft 15 and one-way clutch 16ow. An arm engaging portion 17 of the leading end of the moving arm 16 matingly engages the inside of a long the groove of an engaging block 26 mounted above the stapler 2.

On the other hand, the stapler 2 is supported on guide rails 21 and 22 fastened to the unit frame 300, to move in a direct line on support blocks 23 and 25, between the operating position for stapling sheets, and the retracted position retracted from the operating position. Return springs 18 and 19 constantly urging the stapler 2 to the processing position side are disposed between the unit frame 300 and the backside of the stapler 2 on the guide rails 21 and 22. A staple rack (spur gear) 27 fastened to the slider frames 7 and 8, that moves as one body is disposed on the side portion 2a of the slider frame side of the stapler 2. On a staple rack 27, a pinion gear 34 is rotatably supported on a pinion gear support shaft 35 implanted vertically in the unit frame 300. The corner support member drive gear 31 unitized to the corner support means 3, is a center of rotation of the corner support means 3. This drive gear 31 engages the pinion gear 34.

[Structure of the Finishing Unit]

The finishing unit 1 that finishes sheets on the corner support means 3 is disposed on the unit frame 300 that supports the corner support means 3 described above. The finishing unit 1 shown in the drawings is a stapling unit (hereinafter simply referred to as a stapler). The text below will describe its configuration.

A normal configuration of the stapler 2 provides a head unit 28 for bending a staple in the stapler into a U-shape and for pressing the bent staple into a sheet bundle; an anvil unit 29 for bending the leading ends of the staple driven through the sheet bundles; and a drive cam for pressing and moving the head unit 28 to the anvil unit 29; and the drive motor. These are incorporated into a single body as a unit. The finishing unit 1 composed of the stapler 2 having the structure described above, is mounted to the unit frame 300 to move between a operating position above the stacking tray 210 and a retracted position that is retracted therefrom. Note that the operating position is set to a position for finishing sheets placed on the corner support means 3. Because of the relationship for stapling at an angle of 45 degrees to the sheet corner, the stapler is positioned at the 45 degree angle toward a sheet supported on the corner support means 3. In the same way, as shown in FIG. 8(a), the retracted position is set to a position separated from a sheet on the corner support means 3.

Also, in the same way as with the corner support means 3, the operating and retracted positions of the finishing unit 1 are set on a plane substantially parallel and forming a level difference to a plane on which a sheet is conveyed out from the discharge outlet 106. The reason for this is the same as for the corner support means 3. Namely, this is to make the apparatus more compact. Of particular note, the retracted position of the finishing unit 1 (the position shown in FIG. 8(a)) faces a position of a staple cover 120 disposed in the unit frame 300. The reason for this is to make maintenance of the finishing unit 1, such as replenishing staples, more convenient at the retracted position.

Figure 8A:
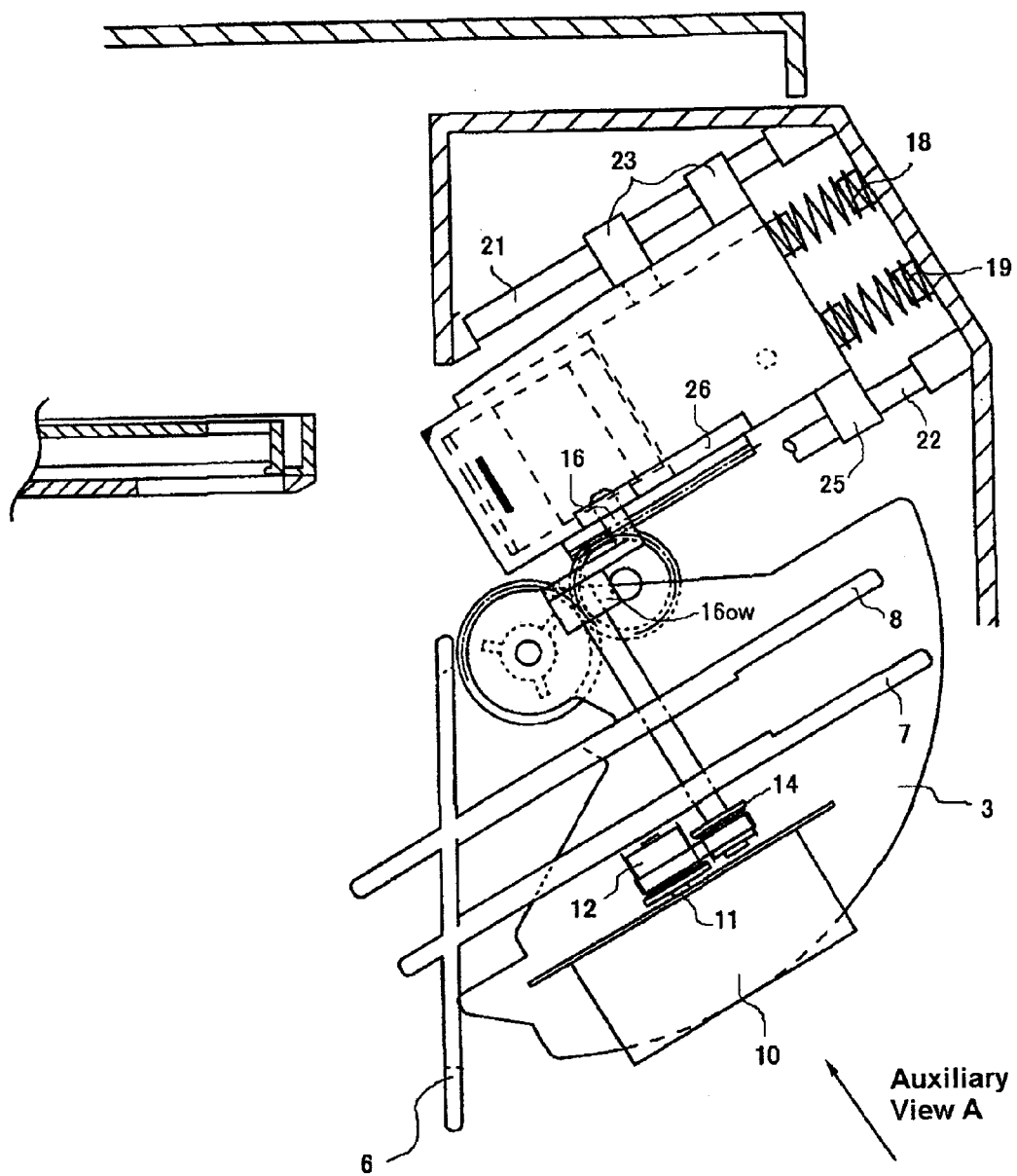
FIG. 8(a) is a plan view of the apparatus depicted in FIG. 4 and shows a stapler and the corner support means at a retracted position.

The following will describe the operations to reciprocatingly move the stapler 2 at the operating position of FIG. 6 therebetween the retracted position of FIG. 8(a). When the stapling process of the stapler 2 is completed on sheets with edges thereof supported on the corner support means 3, a reverse drive start signal is input to the drive motor 10. When the drive motor 10 rotates in the clockwise direction in FIG. 7, that rotation is transmitted to the shaft gear 14 of the drive shaft 15 via the motor pulley 12 and transmission belt 13. Rotating the drive shaft 15 in the clockwise direction also rotates the moving arm 16 in the direction of the arrow r in FIG. 7. The arm engaging portion 17 of the leading end of the moving arm 16 thus applies pushing pressure to the wall of the long groove of the engaging block 26 disposed above the stapler 2. This pushing pressure moves the stapler 2 to the retracted position of the stapler 2 guided along the guide rails 21 and 22.

Note that the one-way clutch 16ow is disposed between the drive shaft 15 and the moving arm 16. This clutch transmits drive from the drive motor 10 only when driving in the clockwise direction of FIG. 7 to rotate the moving arm 16. Specifically, the one-way clutch 16ow is set to transmit drive only when moving to retract the stapler 2 to the retracted position. Incidentally, the staple rack 27 is fastened to the stapler 2 side. The pinion gear 34 meshed with the staple rack 27 also rotates along with the movement of the stapler 2 to the retracted position. This rotatingly drives the corner support member drive gear 31 engaged to that pinion gear 34.

Therefore, as shown in FIG. 6, the corner support means 3 fastened to this also a rotates around the rotating shaft 32 in the counterclockwise direction of the drawing thereby moving to the retracted position shown in FIG. 8(a). In this way, the straight movement of the stapler 2 converts into the rotating movement of the corner support means 3 through the action of a rack and pinion mechanism. Compared to the amount of movement between the operating position and the retracted position for the stapler 2 and the aligning means 5, described below, the amount of movement for the corner support means 3 between the operating position and the retracted predetermined position can be set to be longer.

In other words, when the drive motor 10 rotatingly drives in the counterclockwise direction looking from the output shaft, the stapler 2 and the corner support means 3 interlockingly engaged with the stapler 2, retract to the retracted position shown in FIG. 8(a). Note that the drive motor 10 is a stepping motor. Therefore, when the energizing of the drive motor 10 is locked at the positions of FIGS. 8(a) and 9, the stapler 2 and the corner support means 3, interlockingly engaged with the stapler 2, are fixed at the retracted position.

To unlock the drive motor 10, the stapler 2 is returned to the processing position shown in FIG. 6 by the elastic force of the return springs 18 and 19 disposed between the unit frame 300 and the backside of the stapler 2, when the power is turned off. The stapler 2 and the corner support means 3 rotate in a recovery direction to be positioned at the operating position to support a sheet corner as shown in FIG. 6. At this time, the system rotatingly drives the drive motor 10 in the clockwise direction looking from the output shaft. This recovers the stapler 2 to the operating position shown in FIG. 6. However, because the drive of the drive motor is interposed by the one-way clutch 16ow, the drive force from the drive motor 10 is not transmitted, and the rotation of the moving arm 16 is allowed only for the amount of rotation of the drive motor. The urging forces of the return springs 18 and 19 move the stapler 2 to the operating position. In other words, the braking force of the rotation of the drive motor 10 controls the action of the urging forces of the return springs 18 and 19 allowing for smooth operation.

Note that in the embodiment described above, the drive from the drive motor 10 is transmitted to the stapler 2 and to the corner support means 3. However, it is also perfectly acceptable to interpose gear means to transmit the drive from the drive motor 10 first to the corner support means 3, and then to move the stapler 2. In either case, it is possible to reciprocatingly move members between the operating position and the retracted position with a single drive motor 10.

[Configuration of the Aligning Means]

Aligning means (hereinafter referred to as aligning means 5) is disposed for aligning stacked sheets for processing, on the corner support means 3 described above.

Figure 4:
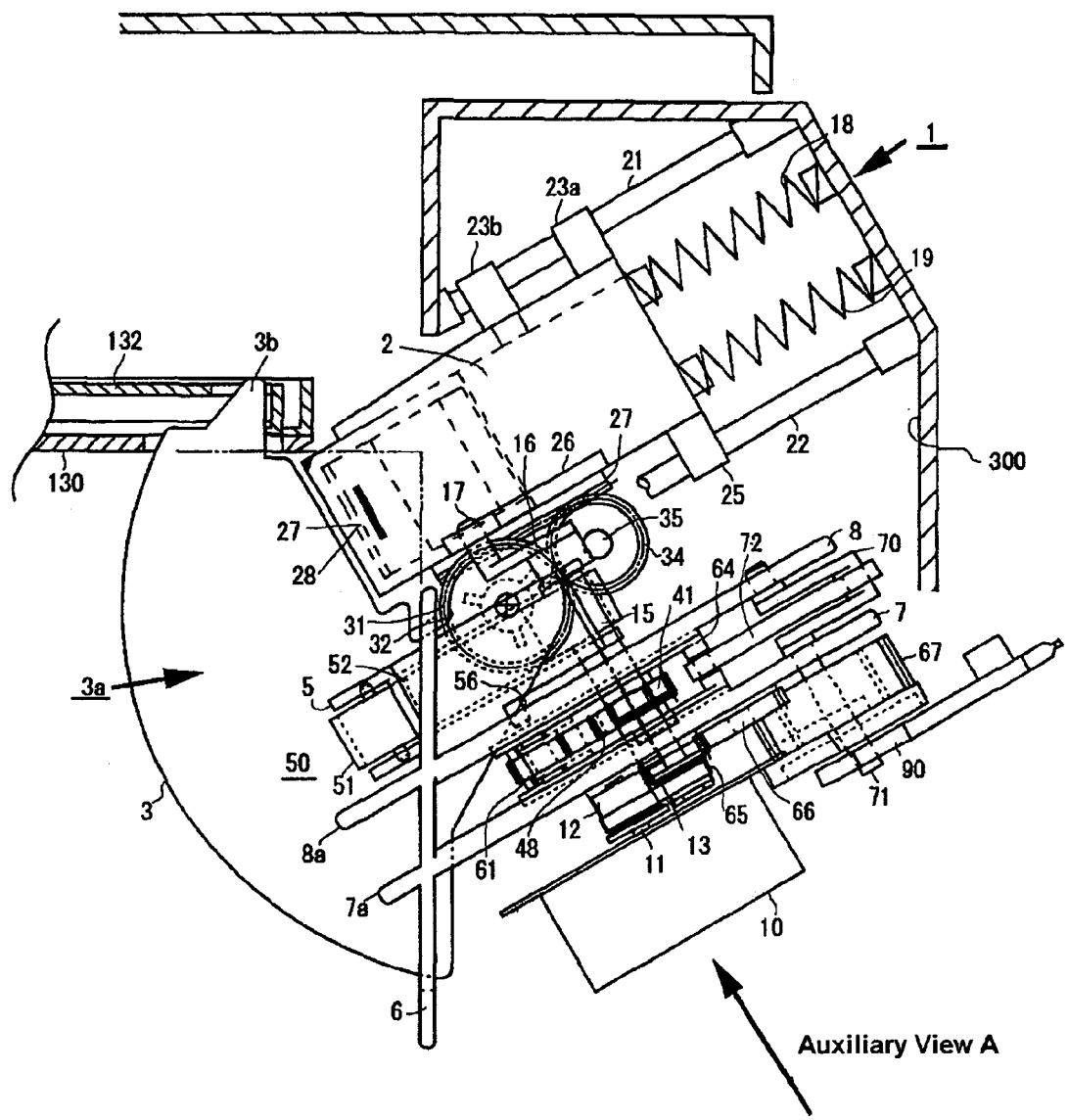
FIG. 4 is a plan view of the finishing unit according to the present invention.
Figure 5:
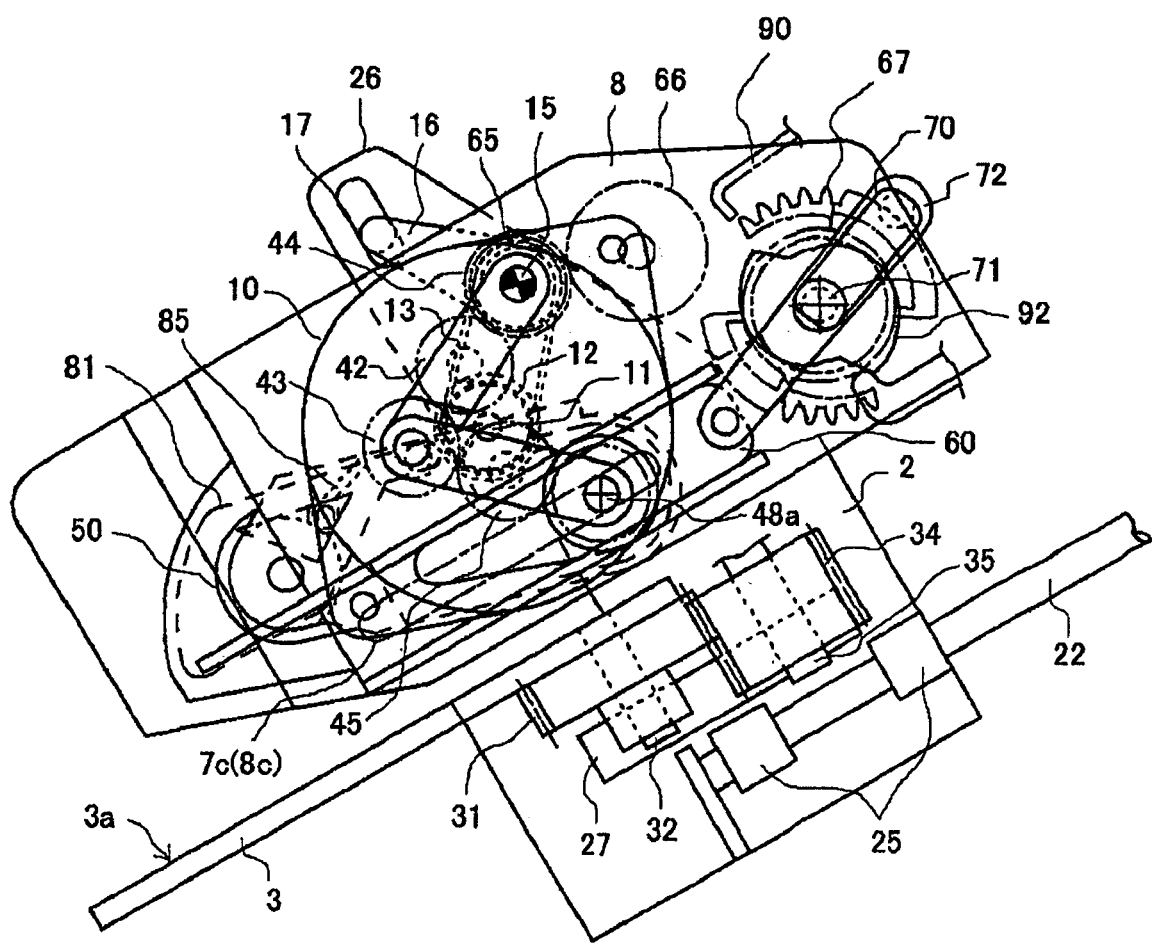
FIG. 5 is a sectional view on the side of the auxiliary view A of the apparatus depicted in FIG. 4.
Figure 10A:
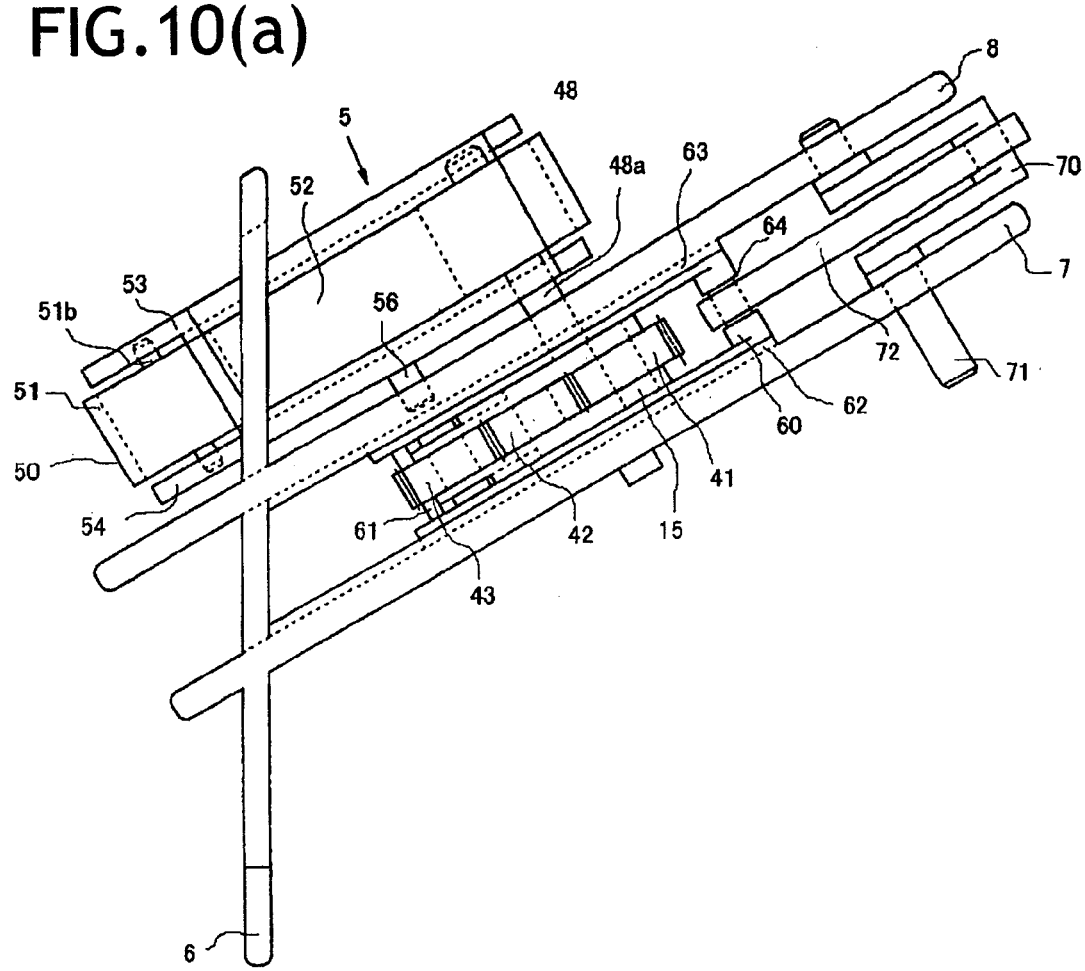
FIGS. 10(a) and 10(b) show the drive structure of aligning means according to the present invention.
Figure 10B:
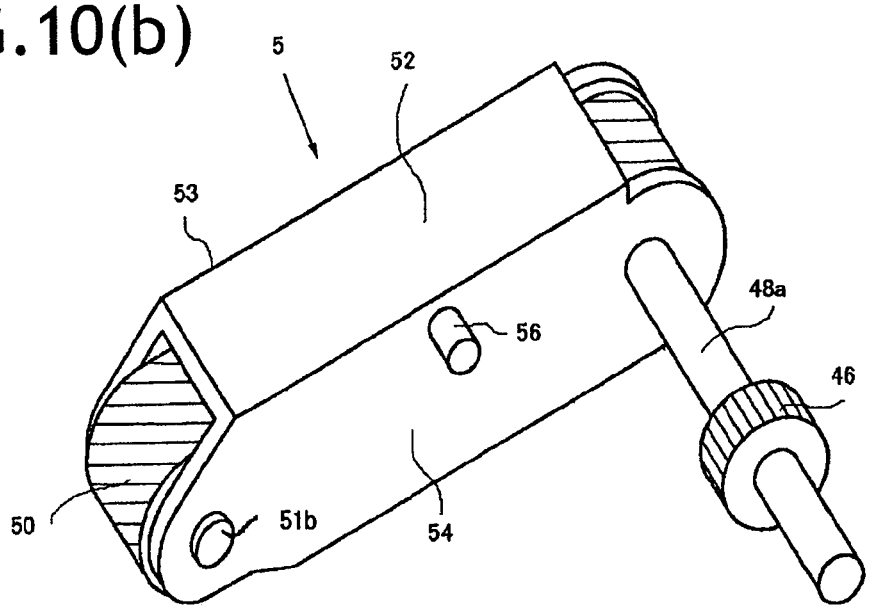
Figure 11:
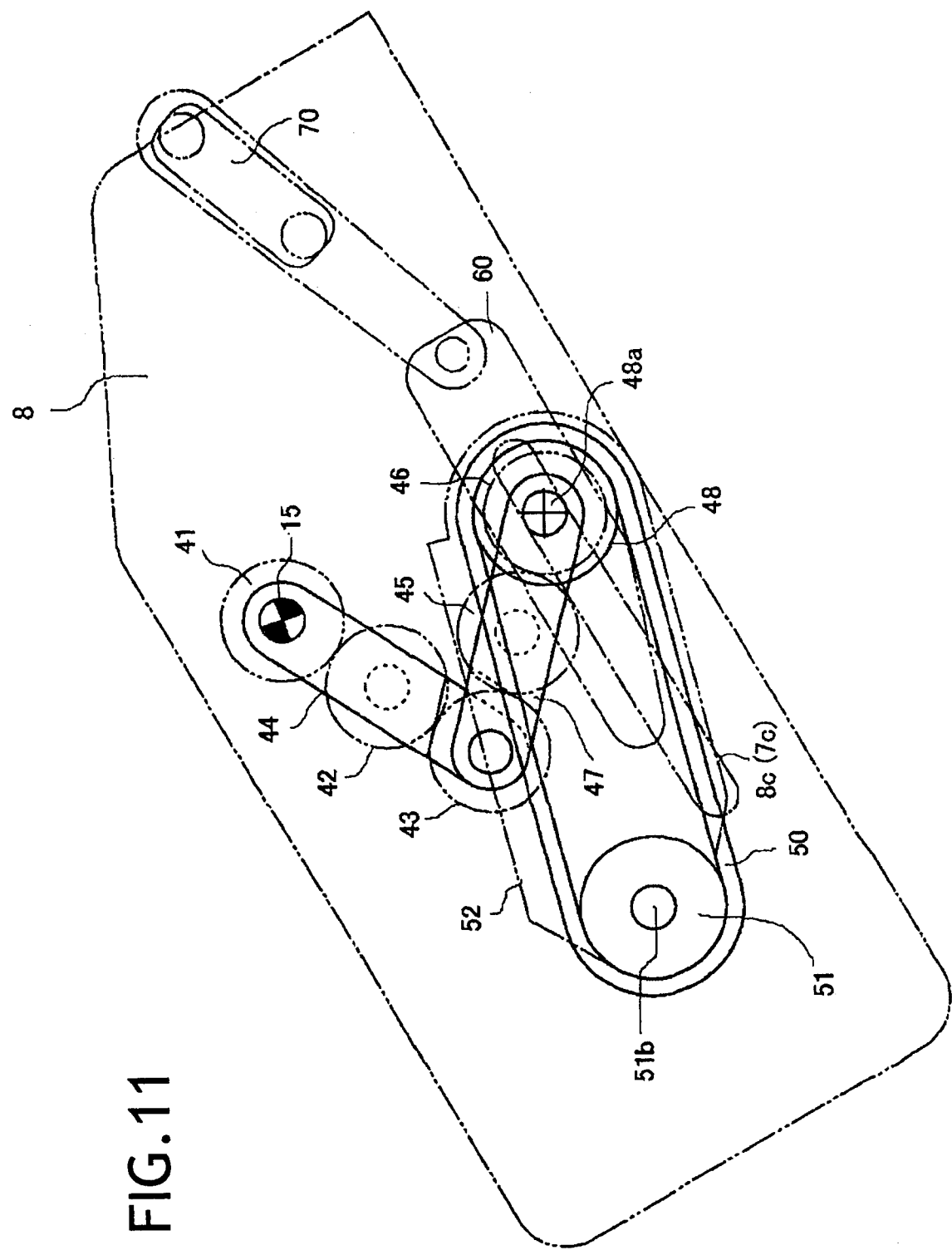
FIG. 11 is a side view of the apparatus depicted in FIG. 10(a).

FIGS. 10(a) to 11 show a drive structure of aligning means 5 for aligning a sheet by aligning a sheet side to a side edge aligning surface 6 (side edge aligning surface) that is the reference position for alignment of sheets stacked on the corner support means 3 shown in FIGS. 4 and 5. This structure allows for the drive from the drive motor 10 to be transmitted to the drive shaft 15 by the transmission belts 13. A central gear 41 is mounted on the drive shaft 15 between the slider frame 7 and the slider frame 8 that support the drive shaft 15. Drive from the central gear 4i is transmitted to a drive gear 46 via a first gear 42, a second gear 43, and a third gear 45. This is shown in FIG. 11. The central gear 41, a first gear 42, and the second gear 43 are rotatably supported on the gear support arm 44 loosely fit on the drive shaft 15. The second gear 43, the third gear 45, and the drive gear 46 are rotatably supported on a gear support arm 47.

The belt drive shaft 48a moves backward and forward inside of the belt drive guide holes 7c and 8c as described below. Even if the drive gear 46 moves, the gears are not disengaged from each other because they are supported by the gear support arm a44 and gear support arm b47. Therefore, the rotational drive force from the drive shaft 15 is transmitted to the drive gear 46, rotatably driving the belt drive pulley 48 disposed on an end of the belt drive shaft 48a.

As is clearly shown for the configuration of the aligning means 5 in FIG. 10(a), the belt drive shaft 48a supports a first bracket 53 and a second bracket 54 that sandwich and support the belt drive pulley 48. The first bracket 53 and the second bracket 54 have an aligning belt cover 52 that covers the top surface of the aligning belt 50. This aligning belt cover 52 prevents a next sheet from coming into contact with the aligning belt 50 while a sheet is being aligned under the aligning belt 50, in the event that a next sheet is conveyed thereunder. This also prevents sheets from becoming damaged or bent. The first bracket 53 and the second bracket 54 support the follower pulley shaft 51b of the belt follower pulley 51 at an opposite side of the belt drive shaft 48a.

Thus, in this way, the aligning means (the aligning belt described above) is supported by support means to enable reciprocated movements between the operating position and the retracted position. These support means are composed of the belt drive shaft 48a, the crank arm 70 and the cam groove 80. The following will describe the operation. When the motor shaft 11 of the drive motor 10 rotates in a clockwise direction looking from the output shaft, the drive shaft 15 rotates in the counterclockwise direction. This drive is transmitted so that the drive gear 46 rotates in the counterclockwise direction from the central gear 41, through the first gear 42, the second gear 43, and the third gear 45. Rotation of the drive gear 46 rotates the belt drive shaft 48a and that rotational force is transmitted to the belt drive pulley 48.

The rotation of the drive gear 46 in the counterclockwise direction rotates the aligning belt 50 trained between the belt drive pulley 48 and a belt follower pulley 51 in a counterclockwise direction. When the aligning belt 50 touches the top surface of a sheet, the sheet moves in the direction of the side edge aligning surface 6. Through this action, the side of a sheet engages aligning surface 6 and is thereby aligned. Note that the drive of the aligning belt 50 also receives drive transmitted from the single drive motor 10 that also moves the stapler 2 and the corner support means 3.

[Configuration for Reciprocated Drive of the Aligning Belt Between the Retracted Position and the Aligning Position]

The aligning means 5 moves among the operating position for aligning sheets, as described below, and the retracted position retracted from the operating position, and a sheet receiving position established between the retracted position and the operating position positioned above a sheet. The following will describe the configuration of the movement between these positions.

For the aligning means 6, the belt drive shaft 48a is arranged between the slider frame 7 of the motor side and the slider frame 8 of the stapler side, and is fittingly supported on a slider 60 linked by a slider front linking pin 61 and a slider back linking pin 64, as shown in FIG. 11. The slider 60 is supported to move to the front and back on the slider rail a62 and the slider rail b63 between the slider frame 7 on the motor side and the slider frame 8 on the stapler side. A crank lever 72 that links a crank arm 70 that rotates is arranged between the slider frame 7 on the motor side and the slider frame 8 on the stapler side is disposed on the slider back link pin 64 of the slider 60. Therefore, when the crank arm 70 is rotatingly driven by the drive system, described below, the crank lever 72 converts to forward and backward movements. Along with this, the slider 60, the slider rail 62 and the slider rail 63 and are supported to move forward and backward.

Figure 12:
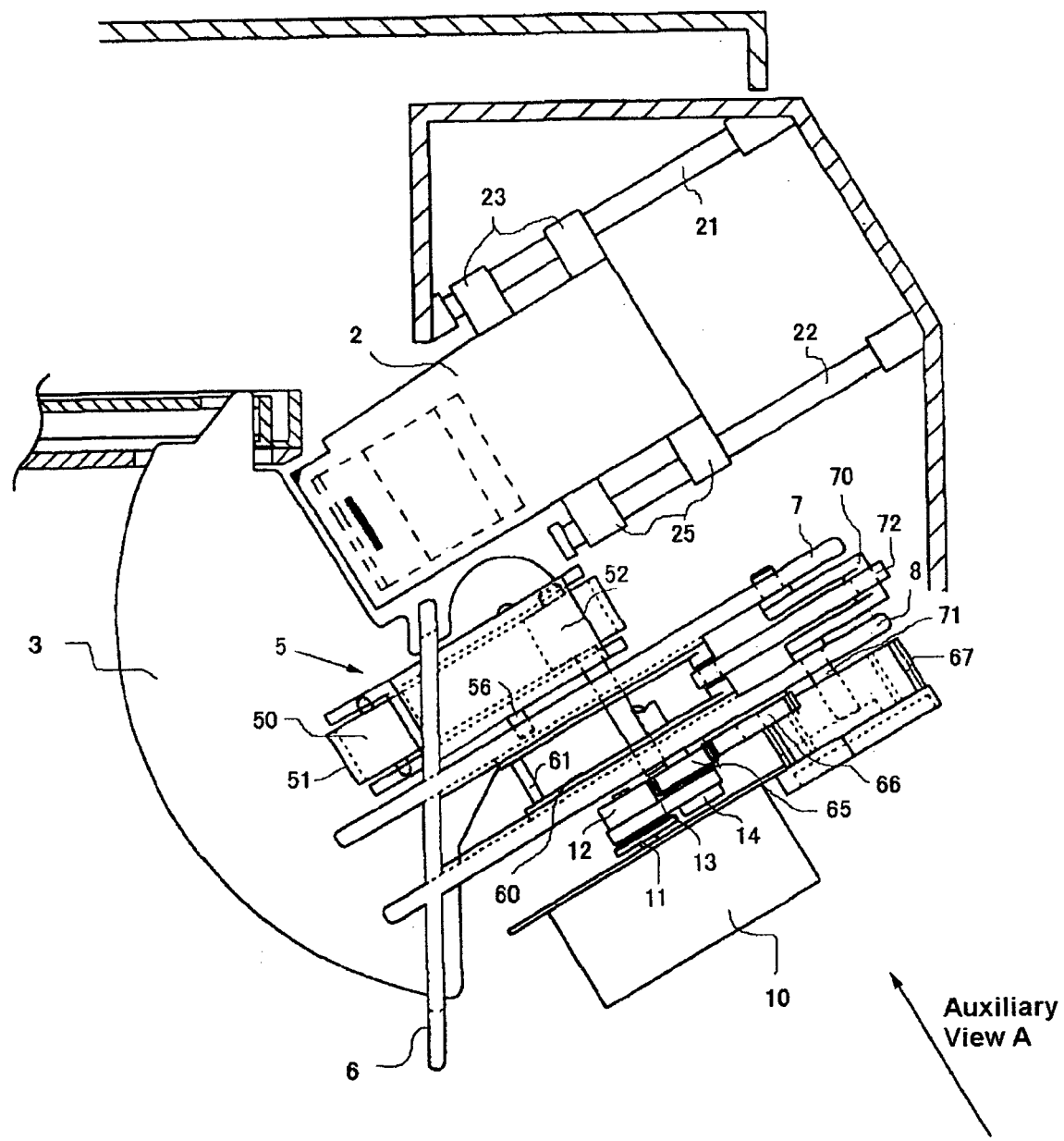
FIG. 12 is a plan view showing the apparatus depicted in FIG. 10 at a retracted (home) position.
Figure 13A:
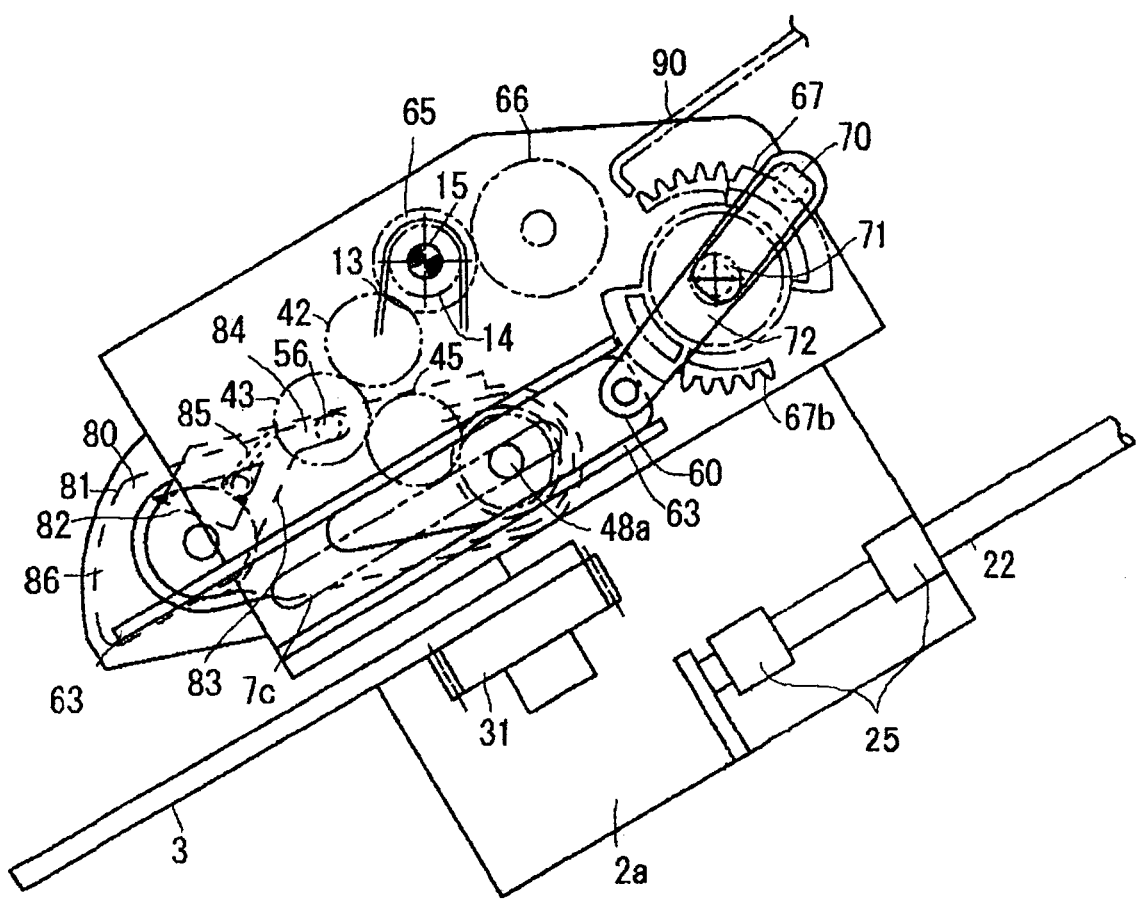
FIG. 13(a) is a sectional view of the auxiliary view A of the apparatus depicted in FIG. 12 and shows a changing flapper in an opened state.
Figure 13B:
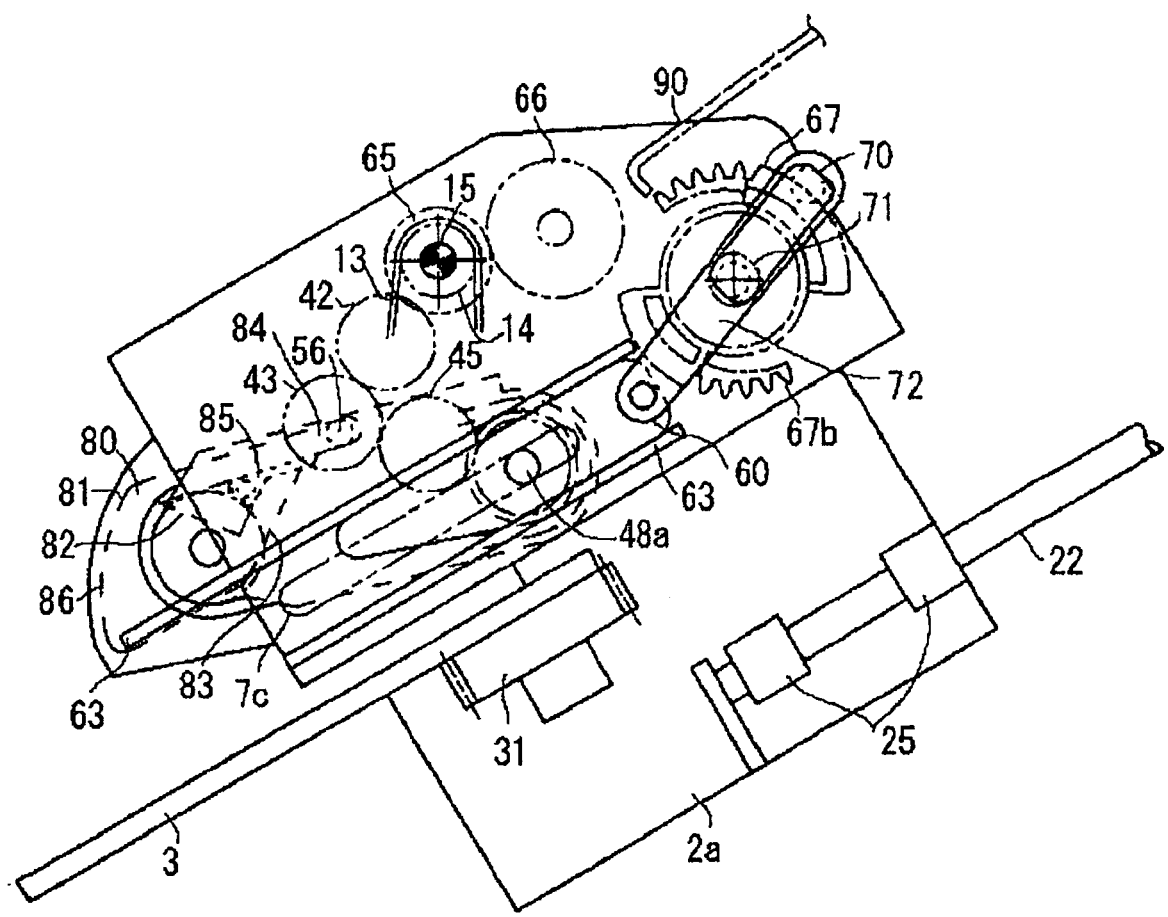
FIG. 13(b) is a sectional view of the auxiliary view A of the apparatus depicted in FIG. 12 and shows the changing flapper in a closed state.
Figure 13C:
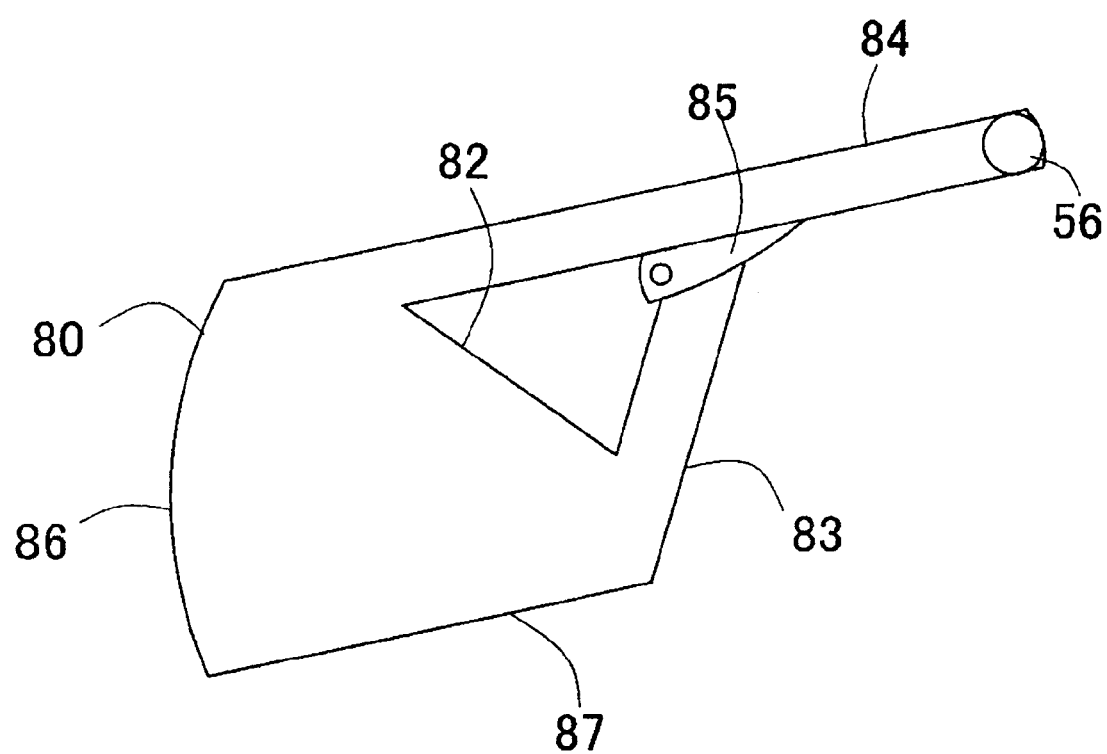
FIG. 13(c) is a sectional view of the auxiliary view A of the apparatus depicted in FIG. 12 and shows an engaging pin at a retracted position.

The following will describe the configuration for the rotational drive of the crank arm 70. As shown in FIG. 12, drive is transmitted to a motor pulley 12 mounted on the motor shaft 11 of the drive motor 10 via the transmission belt 13, and transmitted to the crank transmission gear 65 of the drive shaft 15. The crank transmission gear 65 is mounted to be interposed by a one-way clutch, not shown, to rotatingly drive only when the drive shaft 15 drives in the counterclockwise direction of FIG. 13.

The crank transmission gear 65 is linked to the intermediate transmission gear 66. The intermediate transmission gear 66 is linked to the intermittent gear 67 and rotates as one body with the crankshaft 71 fastened to the crank arm 70. Therefore, when the intermittent gear 67 meshes with the intermediate gear 66, the rotational drive of the drive motor 10 is transmitted, rotating the crank arm 70 thereby moving the slider 60.

Figure 20:
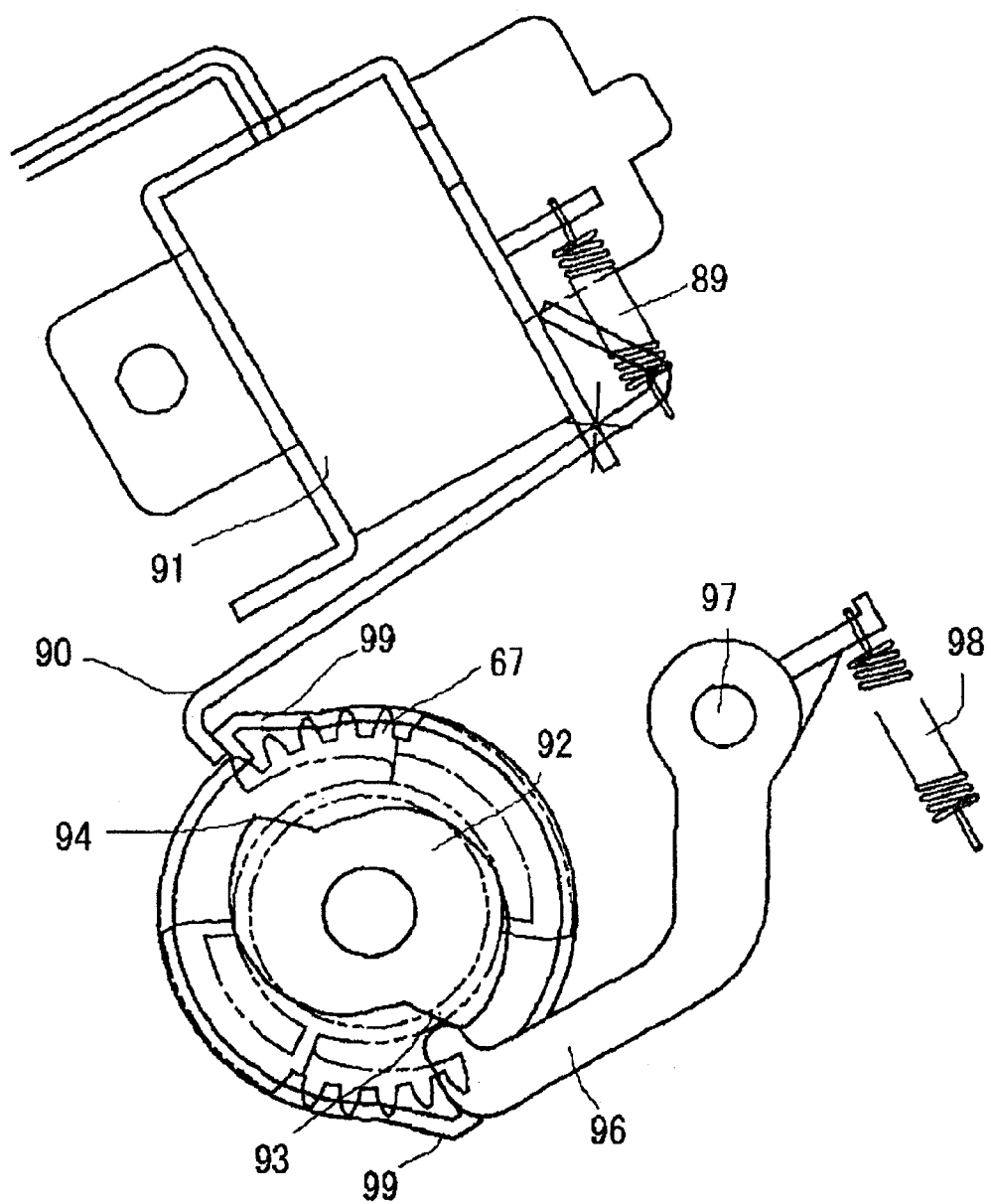
FIG. 20 shows a solenoid arm engaging an intermittent gear according to the present invention, at a predetermined position.
Figure 21:
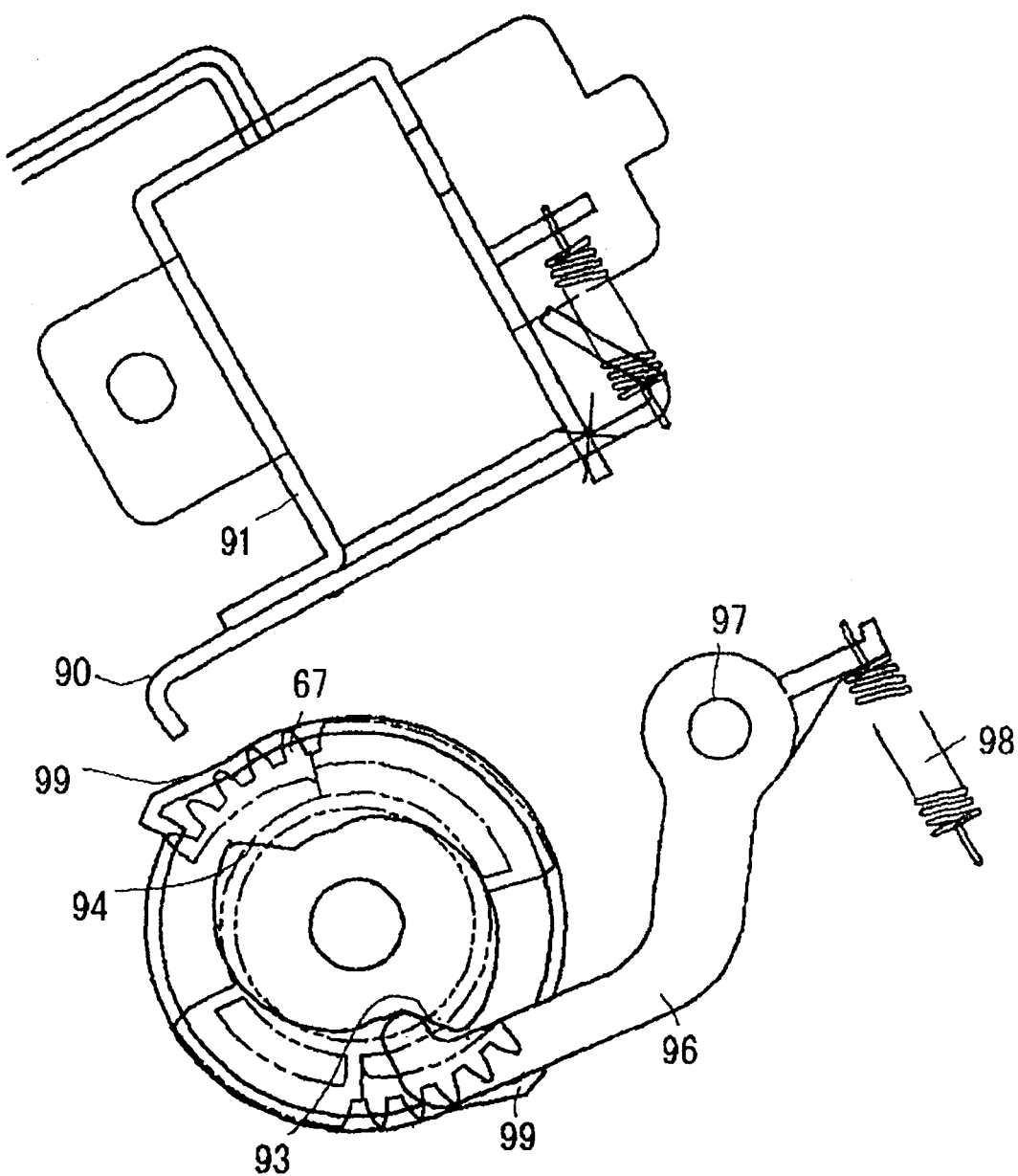
FIG. 21 shows the solenoid arm disengaged from an engaging cam according to the present invention.

The following will describe the intermittent operation of the intermittent gear 67 according to FIGS. 20 and 21. The intermittent gear 67, the eccentric cam 92 that starts the meshing of the intermittent gear 67 with the intermediate gear 66, and the engaging camp 99 are fastened to the crankshaft 71. A cammed urging lever 96 pivotably supported and interposed by lever fulcrum at an appropriate position is disposed confronting the eccentric cam 92. A lever spring 98 is disposed on one end of that lever for urging the cammed urging lever 96. This applies urging force for the initial rotation of the cam in the counterclockwise direction.

FIG. 20 shows a solenoid arm engaged, with the intermittent gear 67 at a predetermined position. In this state, the intermittent gear 67 is not meshed with the intermediate gear 66 and the crank arm 70 is not rotating. In this state, urging force from the cammed urging lever 96 acts on the cammed angle portion a93 of the eccentric cam 92. Therefore, a force is applied to the intermittent gear 67 to constantly rotate in a counterclockwise direction. When the move signal of the aligning means 5 is input to the solenoid 91, the solenoid 91 experiences an attraction operation thereby causing the solenoid arm 90 to disengage from the engaging cam 99, as shown in FIG. 21. When the solenoid arm 90 disengages from the engaging cam 99, the cammed urging lever 96 rotates the eccentric cam 92 in a counterclockwise direction. This rotation causes the leading end portion of the intermittent gear 67 to mesh with the intermediate transmission gear 66. The meshing of gears starts the rotation of the intermittent gear 67, and starts rotating the crank arm 70. This causes the aligning means 5 to move forward and backward. Note that according to this embodiment of the present invention, two untoothed portions are disposed on the intermittent gear 67 to set the stopping position of the aligning means 5.

[Positioning Cam Mechanism of the Aligning Means]

The following will explain the configuration for moving the aligning means 5 among the operating position for aligning sheets, described below, the retracted position retracted from the operating position, and a sheet receiving position disposed above a sheet between the retracted position and the operating position.

As described above, the slider 60 moves forward and backward with the rotation of the crank arm 70. Along with that movement, the aligning means 5 also moves forward and backward. However, with this forward and backward movement, the aligning means 5 also moves between each of the positions of the sheet receiving means (raised), a sheet pulling position, and the retracted position. The movement of the aligning means 5 between each of these positions is made possible by a cam groove 80 disposed on a side plate of the slider frame 8 of the stapler side of the slider frames 7 and 8 that hold the slider 60, and an engaging pin 56 disposed on the second bracket 54 of the aligning means 5, that mates with the cam groove 80. Specifically, the engaging pin 56 is guided along the cam groove 80 thereby determining the position and inclination of the aligning means 5.

The following will described the cam groove disposed on the side plate of the slider frame 8 of the stapler side. The cam groove 80 has on one end a cam holding groove 84 having a width substantially equal to that of the engaging pin 56. On the other end, the cam groove 80 has a cam free groove that allows free movement of the engaging pin 56; a cam lower surface groove 87 for determining the lowest cam position of the engaging pin 56, and a cam rising wall 83 that raises the engaging pin 56 from the cam lower surface groove 87 to the cam holding groove 84.

These cam grooves are composed of the cam outer wall 81 that determines the outer circumference, and the cam inner wall 82 that regulates the movement of the inner side of the engaging pin 56. A changing flapper 85 for regulating the movement of the engaging pin 56 is disposed at the merging section of the cam rising wall 83 in the cam holding groove 84. This changing flapper 85 is constantly urged to a direction for closing the cam rising wall 83 (clockwise direction of the drawing). When the engaging pin 56 moves from the cam holding groove 84 toward the cam free groove 86, this changing flapper 85 prevents the engaging pin 56 from falling into the cam rising wall 83. Conversely, this changing flapper 85 allows the engaging cam 56 to move from the cam rising wall 83 side into the cam holding groove 84.

[Operation of the Aligning Means]

FIGS. 12 and 13(a) to 13(c) show a state prior to a sheet being discharged to the corner support means 3, and the aligning means 5 positioned at a retracted position furthest away from the corner support means 3. In this state, the slider 60 is positioned at the furthest right side, as shown in the drawings. Furthermore, the engaging pin 56 is also positioned at a right side of the cam holding groove 84. In this state, the solenoid arm 90 is engaging the engaging cam 99 and the intermittent gear 67 is not meshed with the intermediate transmission gear 66, as was described in relation to FIG. 20.

Figure 14:
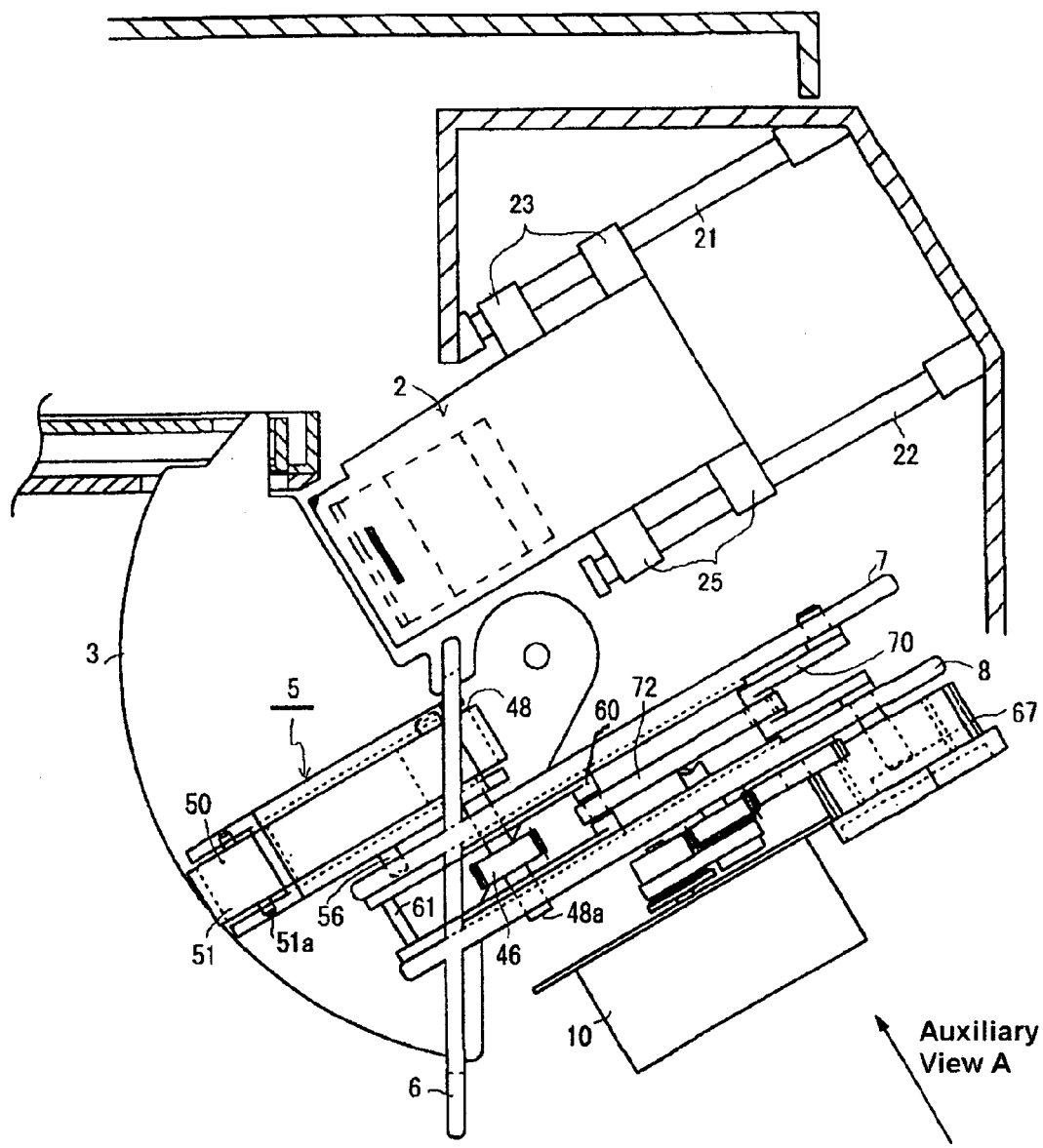
FIG. 14 is a plan view of the apparatus depicted in FIG. 10(a) at a sheet receiving (raised) position.
Figure 15A:
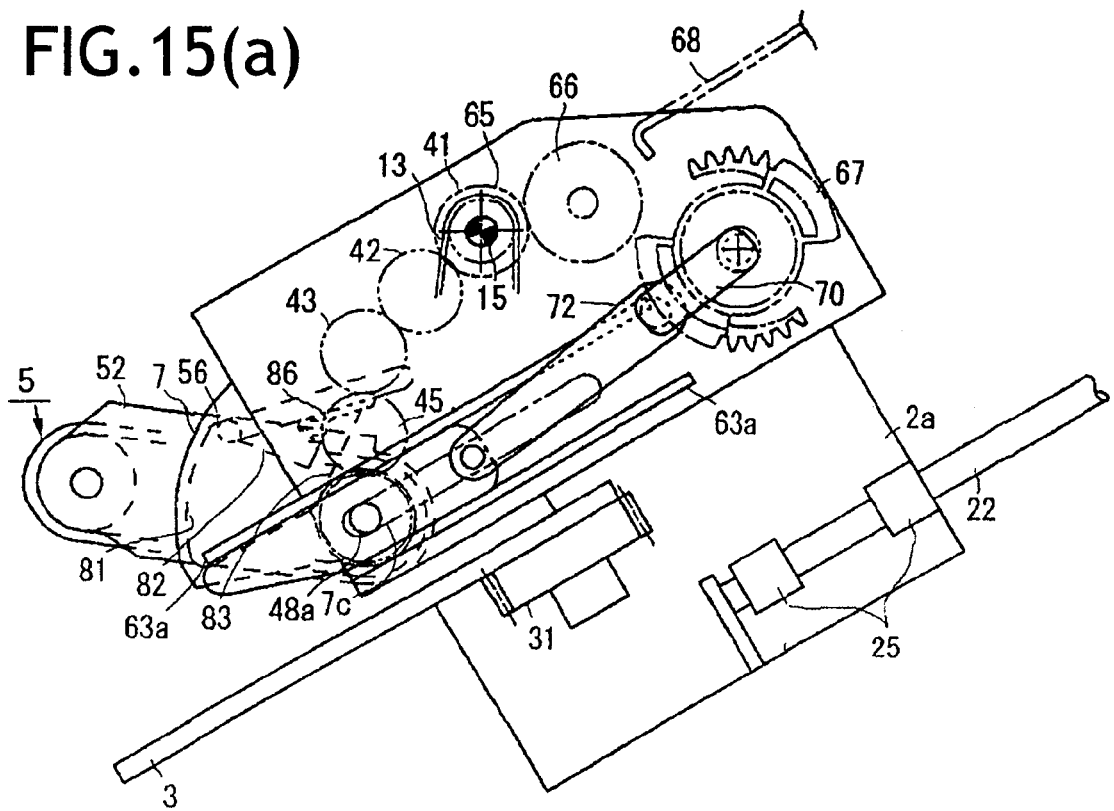
FIG. 15(a) is a sectional view of the auxiliary view A of the apparatus depicted in FIG. 14 showing the aligning means at their highest position.
Figure 15B:
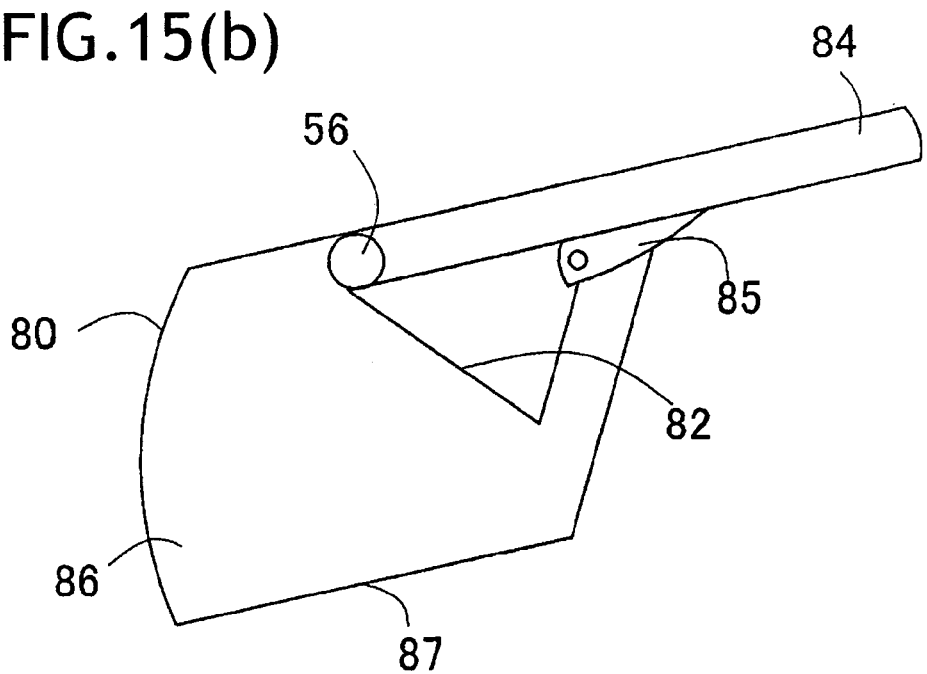
FIG. 15(b) is a sectional view of the auxiliary view A of the apparatus depicted in FIG. 14 showing the engaging pin moving inside a cam holding groove.

Next, after a sheet has been discharged to the top of the corner support means 3, a sheet aligning start signal is input thereby energizing the solenoid 91. This causes the solenoid arm 90 to disengage from the engaging cam 99 causing the intermittent gear 67 to mesh with the intermediate transmission gear 66. This causes the crankshaft 71 and crank lever 72 to start rotating and move the slider 60 to the left side of the drawings. Referring to FIGS. 14 and 15, the belt drive shaft 48a that is rotatingly supported on the slider 60 also moves to the left side of the drawings with this action. At this time, the engaging pin 56 mounted on the second bracket 54 moves to left side of the drawings over the cam holding groove 84 passing over the changing flapper 85. FIG. 15(a) shows the aligning means position at its highest position over a sheet conveyed over the corner support means 3. According to this embodiment of the present invention, the gap between the aligning means 5 and the corner support means 3 is set to approximately 40 degrees. This angle makes it possible for the aligning means 5 to touch a sheet conveying in from above the sheet even if there is some curling in the conveyed sheet.

The engaging pin 56 moves further in the left direction and passes over the left edge of the cam inner wall 82 in the drawing. The aligning means 5 drops downward under their own weight as the engaging pin 56 passes over the cam inner wall 82. The engaging pin 56 moves toward the cam lower surface groove 87. If there are several sheets already placed and aligned on the corner support means 3, the sheet touching position of the aligning belt 50 can vary its pressure to ensure the most appropriate pressure to touch the sheets. If the touching pressure is too light, a weight, not shown, can be applied to the aligning means 5 making it possible to adjust this touching pressure. Because of the configuration to allow the aligning means 5 to fall under its own weight and to move toward the cam lower surface groove 87, it is possible to adjust the appropriate touching pressure without any maleffecting aligning even if the amount of sheets stacked on the corner support means 3 changes.

Figure 16:
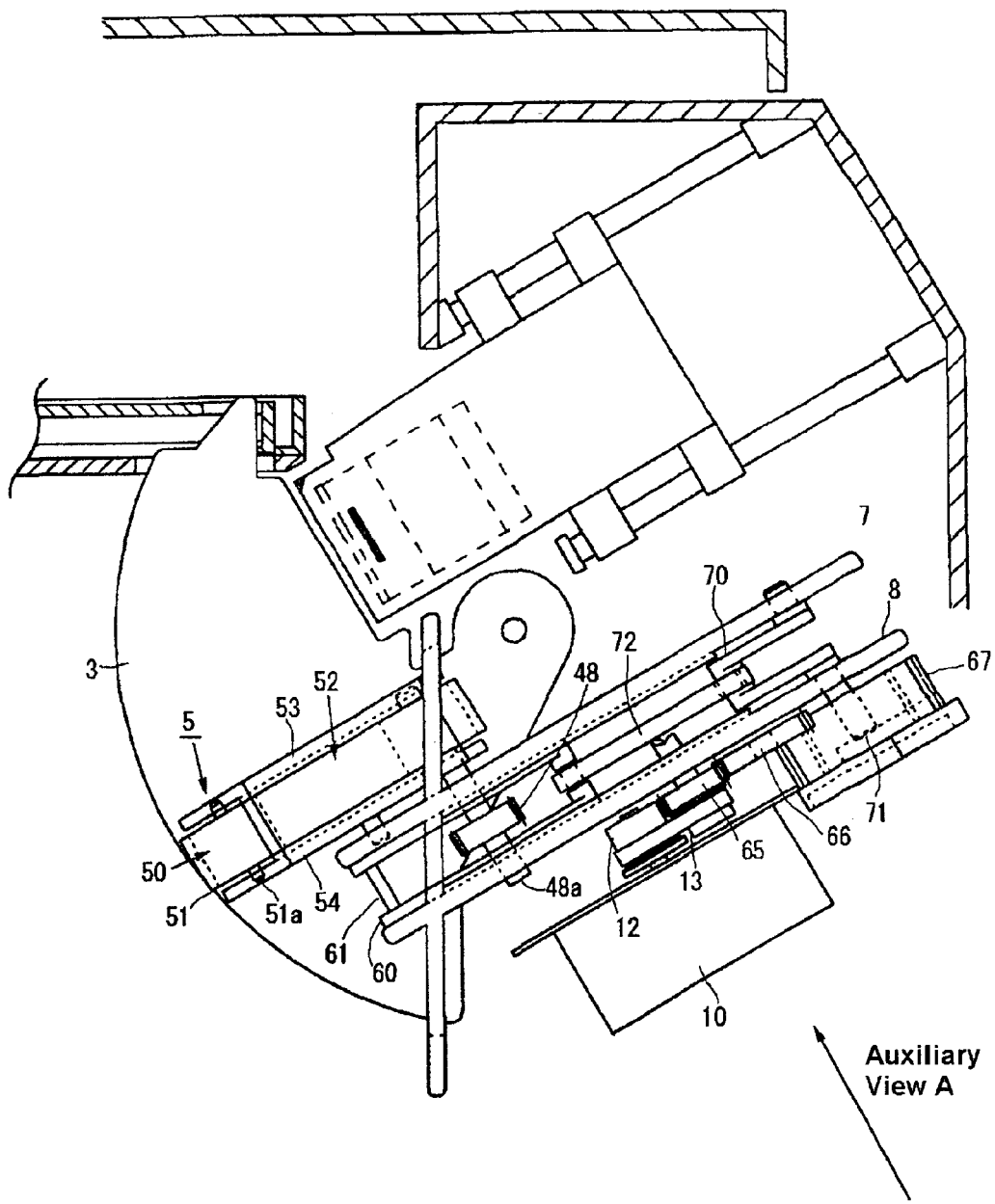
FIG. 16 is a plan view of the apparatus depicted in FIG. 10(a) at an aligning starting, position.
Figure 17A:
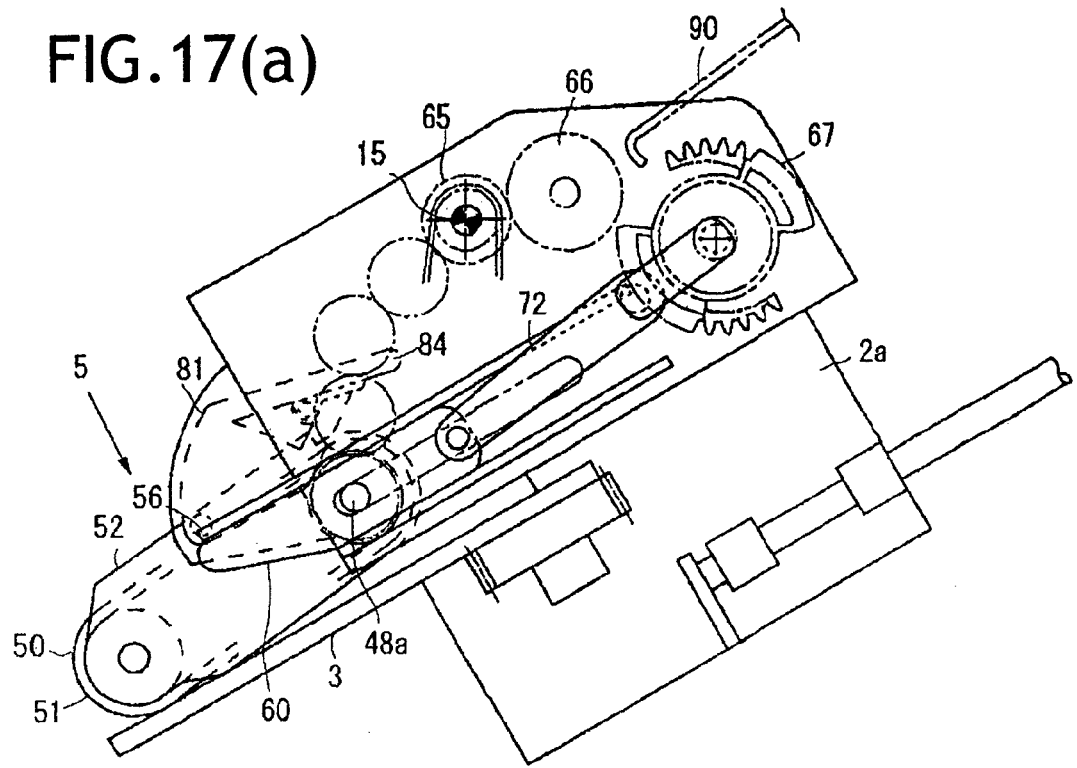
FIG. 17(a) is a sectional view of the auxiliary view A of the apparatus depicted in FIG. 16 showing the aligning means touching a sheet on a corner support under its own weight.
Figure 17B:
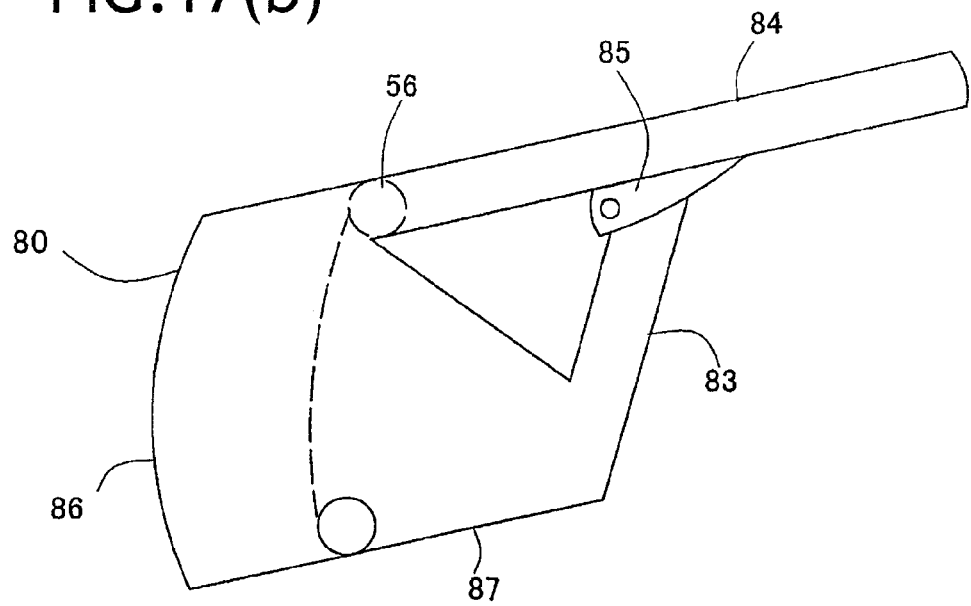
FIG. 17(b) is a sectional view of the auxiliary view A of the apparatus depicted in FIG. 16 showing the engaging pin moving inside a cam free groove.

The drawings show the engaging pin 56 of the aligning means 5 moving further to the left side of the drawings of the cam inner wall 82, then lowering under its own weight. The aligning means 5 touches a sheet on the corner support means 3 under their own weight. In other words, in this state, the aligning means 5 is rotatingly supported only by the belt drive shaft 48a. Therefore, the aligning means 5 rotatingly moves using the belt drive shaft 48a as a pivot point to touch a sheet under the weight of the aligning means 5. Referring to FIGS. 16 and 17(a) and 17(b), the meshing of the intermediate transmission gear 66 and intermittent gear 67 is set to disengage. For that reason, the movement of the aligning means 5 in the forward and backward directions is stopped. On the other hand, the aligning belt 50 is configured to be able to rotatingly drive in a counterclockwise direction of the drawings. This makes it possible to align a sheet in the aligning reference direction with the movements to the front and back directions stopped.

Figure 18:
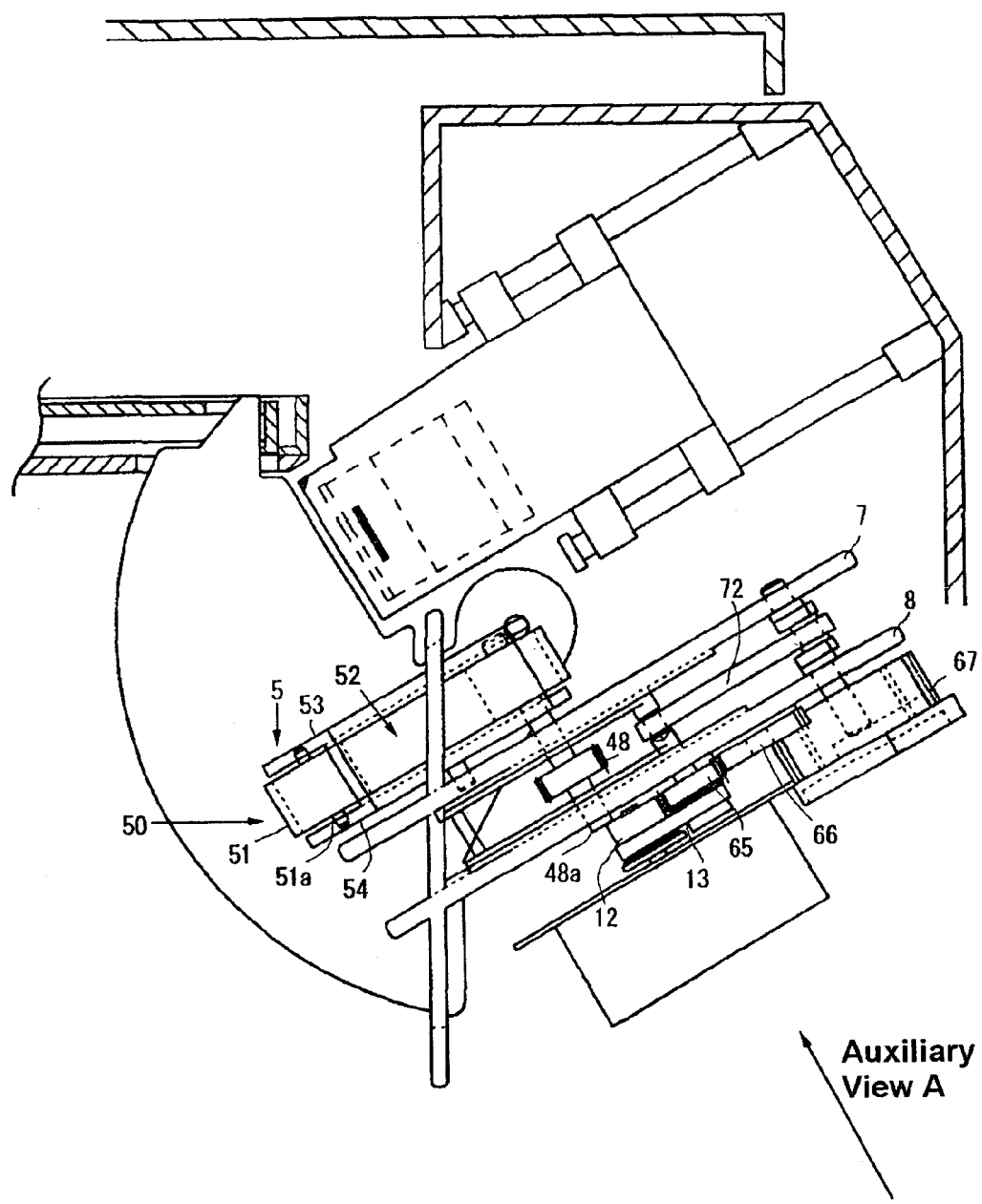
FIG. 18 is a plan view of the apparatus depicted in FIG. 10(a) at a sheet retracting position.
Figure 19:
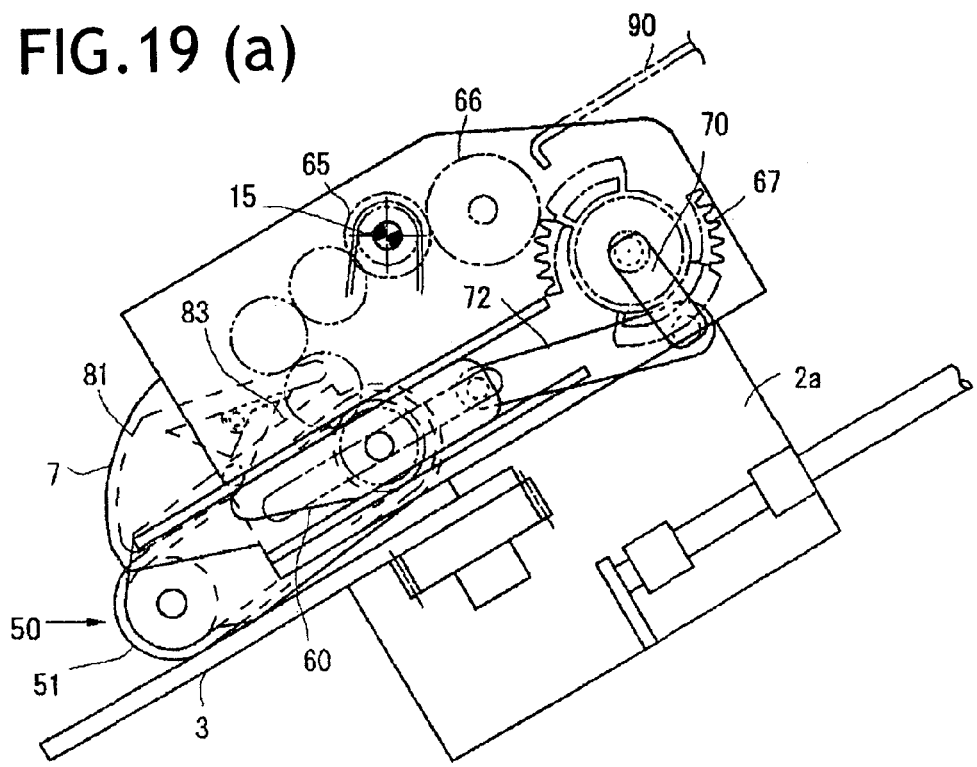
FIG. 19(a) is a sectional view of the auxiliary view A of the apparatus depicted in FIG. 18 showing the aligning means at the sheet pulling position.
FIG. 19(b) is a sectional view of the auxiliary view A of the apparatus depicted in FIG. 18 showing the engaging pin positioned at a right side of a cam lower surface groove.
Figure 19:
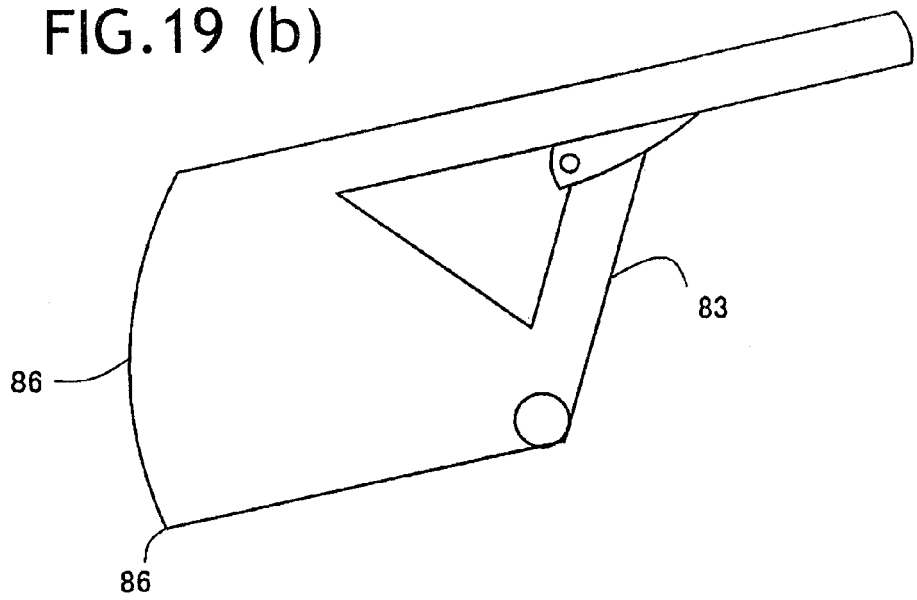

When the aligning action by the aligning belt of the aligning means 5 has been conducted for a predetermined amount of time, the solenoid 91 is energized again causing the solenoid arm 90 to disengage from the engaging cam 99. This disengagement causes the intermittent gear 67 to mesh with the intermediate transmission gear 66. This causes the crank arm 70 to start rotating in the counterclockwise direction of the drawing. This rotation moves the slider 60 to the right side of the drawing, and moves the aligning means 5 also to the right side of the drawing. Referring to FIGS. 18 and 19(a) to 19(b), this movement moves the engaging pin 56 to the right side of the drawing. The engaging pin 56 rises from the cam lower surface groove 87 to the cam rising wall 83 and pushes up to the changing flapper 85 at the top end of the cam rising wall 83 and moves further to the right end position of the cam holding groove 84. When the engaging pin 56 moves to the right end position of the cam holding groove 84, the aligning means 5 is returned to the retracted position shown in FIGS. 12 and 13. In this state, a next sheet can be conveyed in. When the sheet is conveyed in, the operations shown in FIGS. 12 to 19(c) are performed to align the next sheet.

According to the embodiment described above, the two operations of rotatingly driving the alignment means 5 belt in the aligning direction, and the advancing and retracting operations of the slider 60 that supports the alighting means 5 and moves them back and forth are performed by the drive of a single drive motor 10. Note that the drive from the drive motor 10 is transmitted to retract the stapler 2 and the corner support means 3 to the retracted position. Note that the two operations of rotatingly driving the alignment means 5 belt in the aligning direction, and the advancing and retracting operations of the slider 60 that supports the alighting means 5 and moves them moves back and forth can also be done by a different motor.

[Sheet Edge Support Means Configuration]

Figure 22:
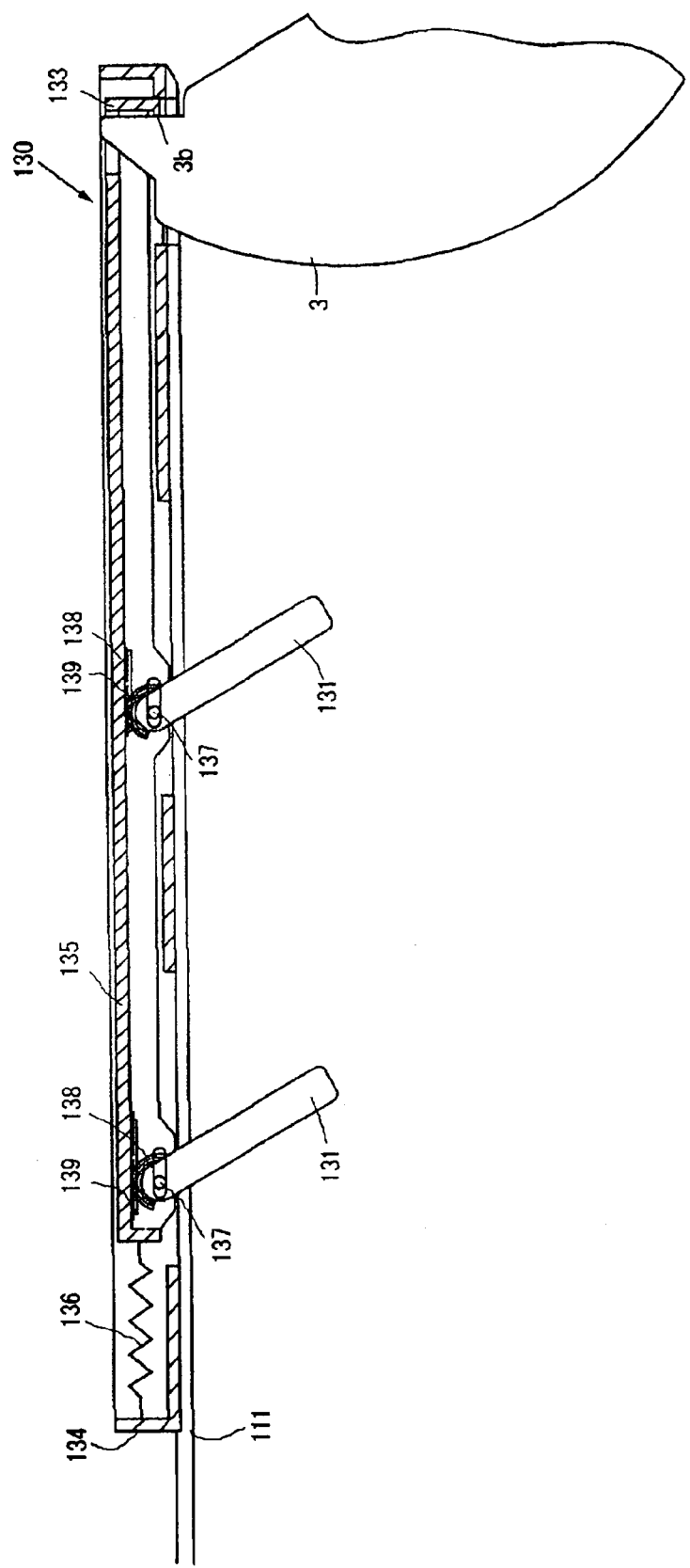
FIG. 22 shows a sheet edge support means according to the present invention at a processing position.
Figure 23:
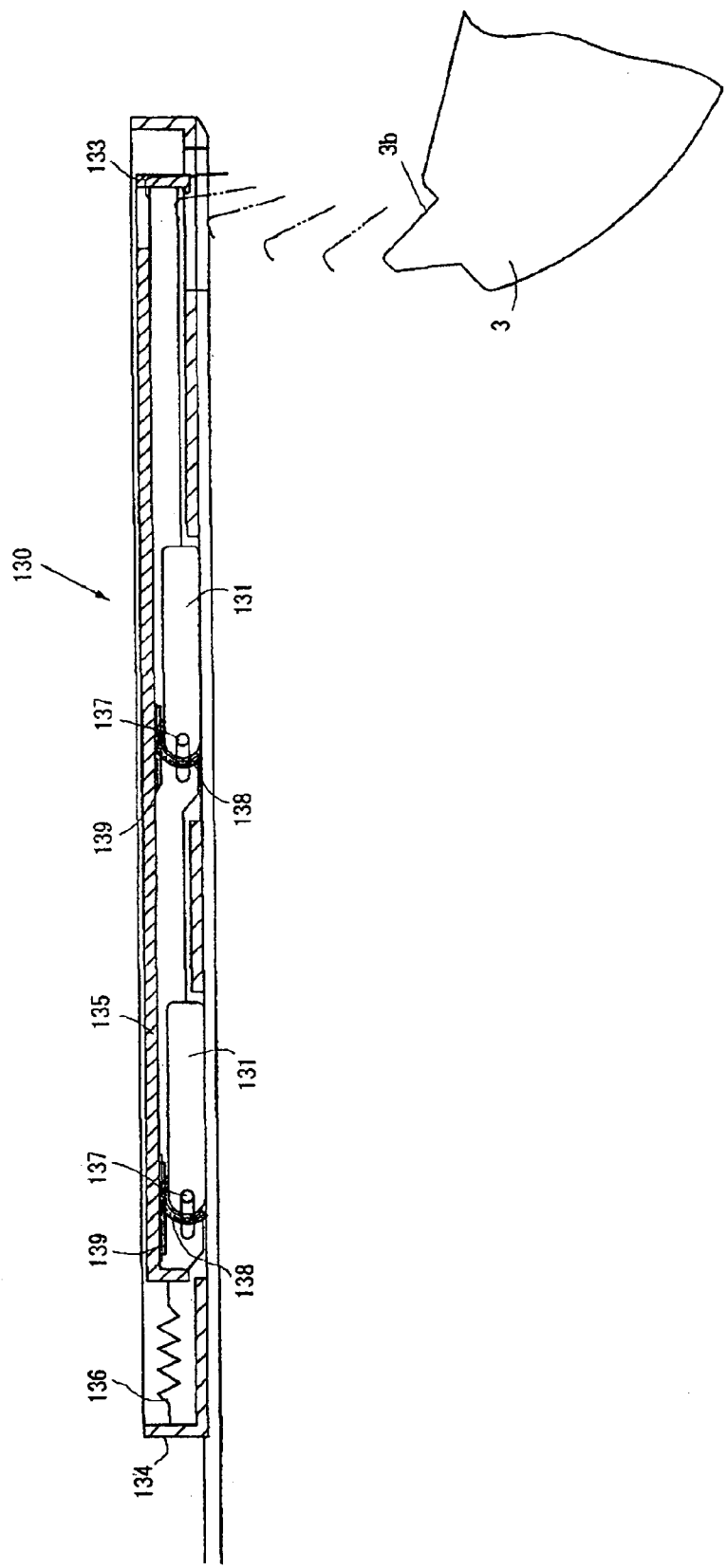
FIG. 23 shows the sheet edge support means according to the present invention at the retracted position.
Figure 24:
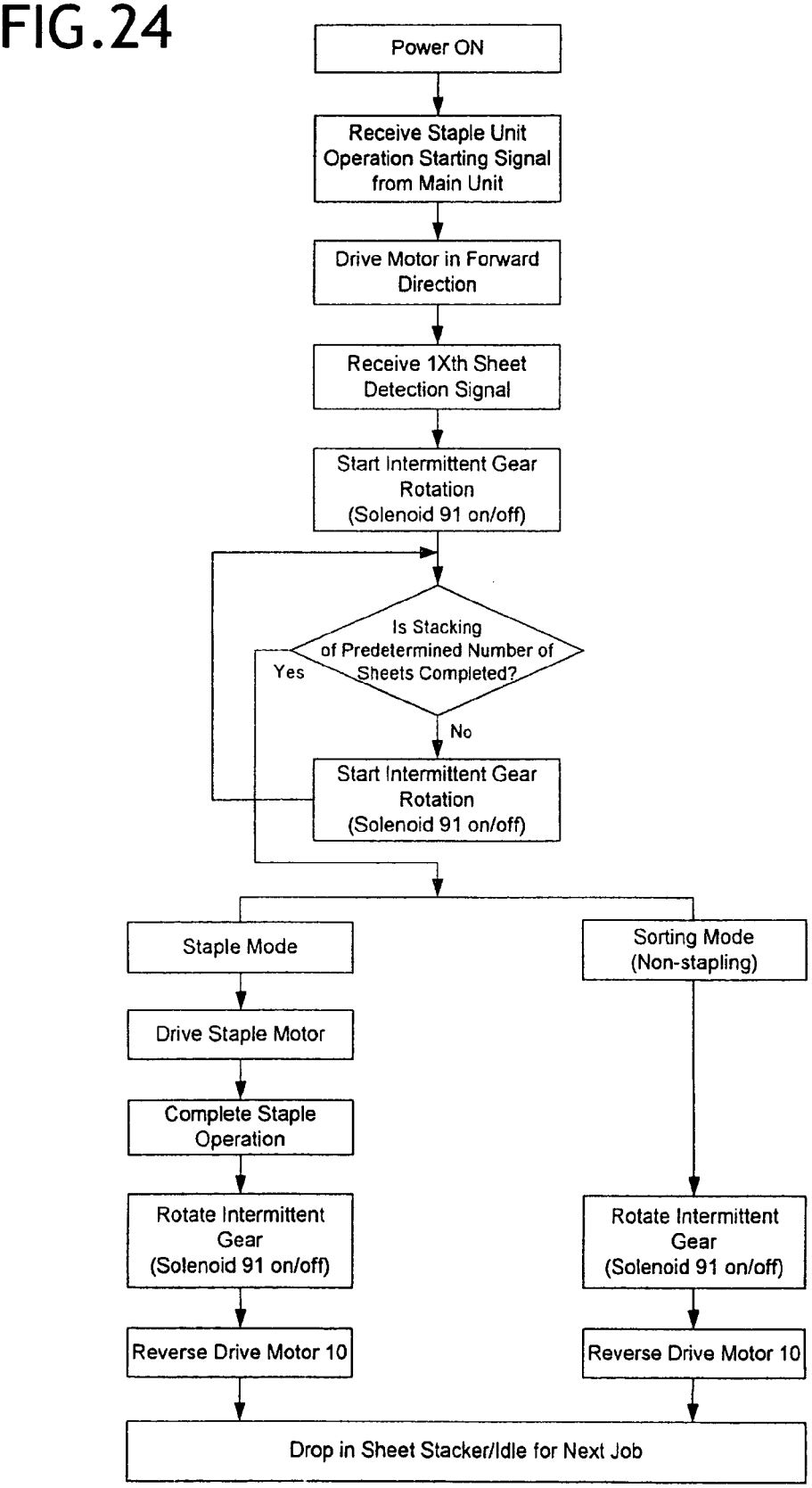
FIG. 24 is an operation flowchart of the apparatus according to the present invention.

As shown in FIGS. 3(b), 22, and 23, this embodiment of the present invention is also provided the sheet edge support means 130 (trailing edge reference surface; the same applies below) for supporting a sheet at a width direction of the sheet along with the corner support means 3 for sheets discharged from the main device. When there is a level difference between the sheet support surface 3a of the corner support means 3 and the stacking tray lower portion 109 near the discharge outlet, these trailing edge support members make it possible to stabilize and support a sheet on the corner support means 3. Note that if there is not much of a level difference, it is perfectly acceptable not to arrange this trailing edge support member.

The trailing edge reference surface 130 has lever members 131 that move between a position for supporting a sheet and a retracted position retracted from the supporting position; an outer frame 134 that supports this; and the fastening pin 137 for rotatably supporting the lever members 131 on the outer frame 134. The operating position which is the sheet supporting position of the trailing edge reference surface 130, and the retracted position are set on a plane substantially parallel and having a level difference to a plane on which a sheet is conveyed out from the discharge outlet 106. The reason for this is the same as for the corner support means 3. Namely, this is to make the apparatus more compact.

The moving frame 135 linked and constantly urged by a reciprocal spring 136 on one side is embedded on the inner side of the outer frame 134. A rack 139 is disposed near the fastening pin 137 of the lever members 131 of the moving frame 135. A pinion 138 is disposed on the outer circumference surface of the fastening pin 137 of the lever members 131 and mates with the rack 139. Therefore, when this moving frame 135 moves, the rack 139 also moves. This rotates the pinion 138 that mates with the rack 139. This rotation moves the lever members 131 between a position for supporting a sheet and a retracted position retracted from this supporting position.

The movement of this moving frame 135 is performed by the rotational movement of the corner support means 3, as depicted in FIGS. 4, 6 and 8(a). In other words, a lever support member moving engagement portion 3b disposed on the corner support means 3 interlockingly moves the moving frame 135. In other words, as shown in FIG. 4, if the corner support means 3 is at the operating position for supporting a sheet, the lever support member moving engagement portion 3b extends the moving frame 135 to the right side of the drawing. In this state, the bottom surface of a sheet discharged from the main device is supported by the corner support means 3 and two lever members 131.

On the other hand, as shown in FIG. 8(a), when the corner support means 3 is positioned where a sheet can fall into the stacking tray 210, in other words when the corner support means 3 has moved to the retracted position, the lever support member moving engagement portion 3b releases the extension of the moving frame 135. When this is released, the return force of the return springs 136 described above, moves the moving frame 135 to the left side of the drawing. This movement moves the lever members 131 from the sheet support position to the retracted position. This, in turn, removes the support of all stacked sheets causing them to fall and accumulate in the stacking tray 210.

At this time, as shown in FIG. 8(a), the corner support means 3 rotates in a counterclockwise direction of the drawing, pushing all of the sheets supported thereupon against the side edge reference surface 6. In the same way, the lever member 131 pulls these supported sheets against the trailing edge reference surface 130 as well as toward the side edge reference surface 6 by the corner support means 3. Therefore, in the process to move the corner support means 3 and the lever members 131 from the operating position to the retracted position the sheets stacked thereupon are pushed against each reference surface so that the stack of sheets does not collapse. In this way, the corner support means 3 and the lever members 131 are configured to move from the operating position to the retracted position on substantially the same plane as the stacked sheets on the tray. The directions of their movements (the arrow in the drawings) are set to push/pull sheets against the side edge reference surface 6 and the trailing edge reference surface 130. Therefore, sheets can be stored on the tray without disruption of their positions.

Figure 8C:
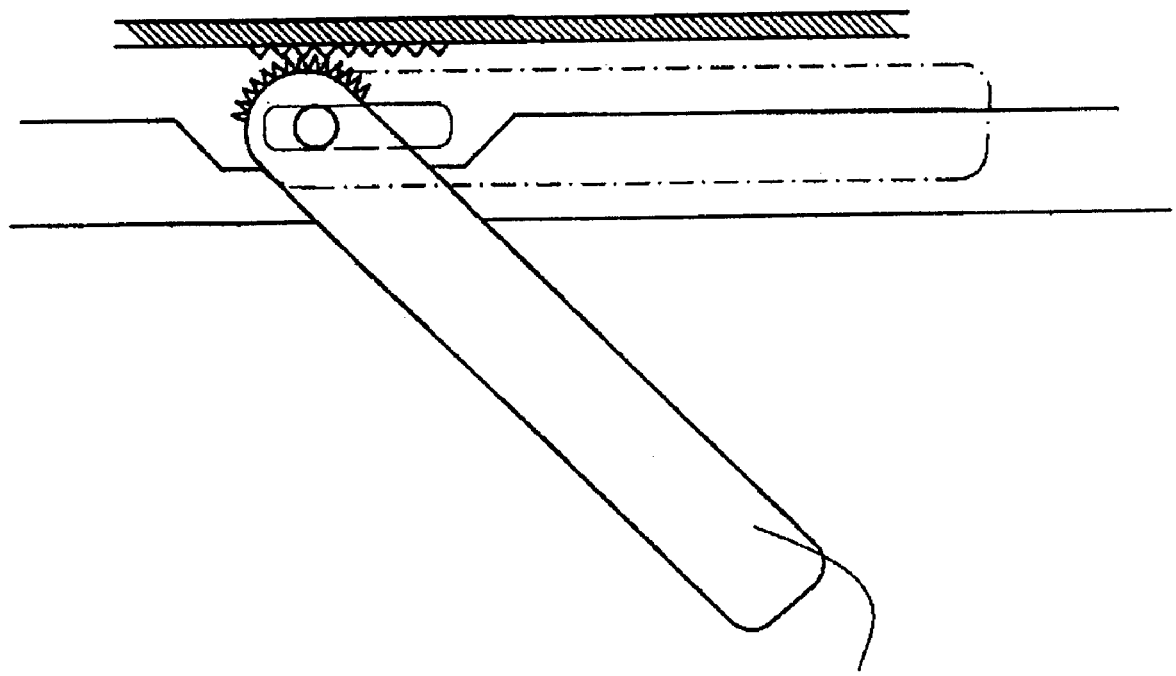
FIG. 8(c) is a plan view of the apparatus depicted in FIG. 4 and is an expanded view of a portion of FIG. 8(b).
Figure 8D:
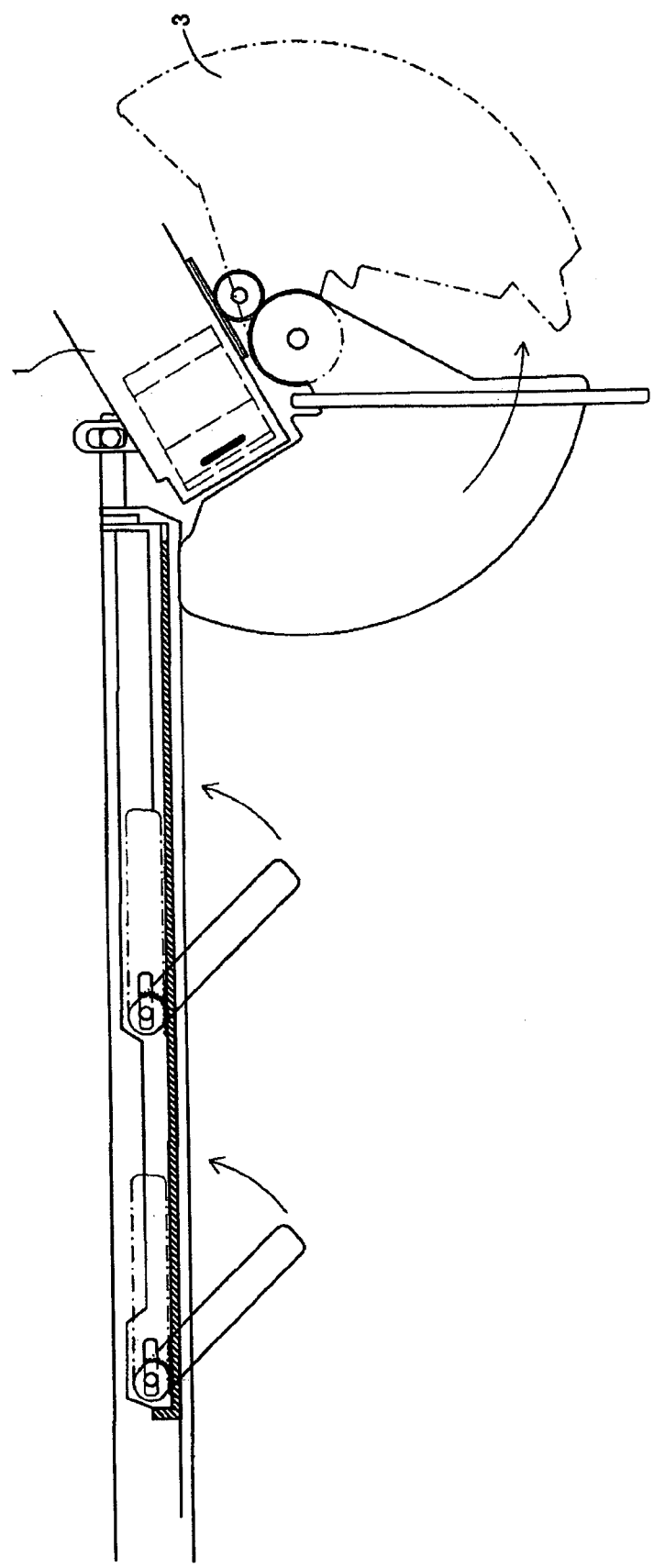
FIG. 8(d) is a plan view of the apparatus depicted in FIG. 4 and shows a structure of a trailing edge support member that differs from that of FIG. 8(b).
Figure 8E:
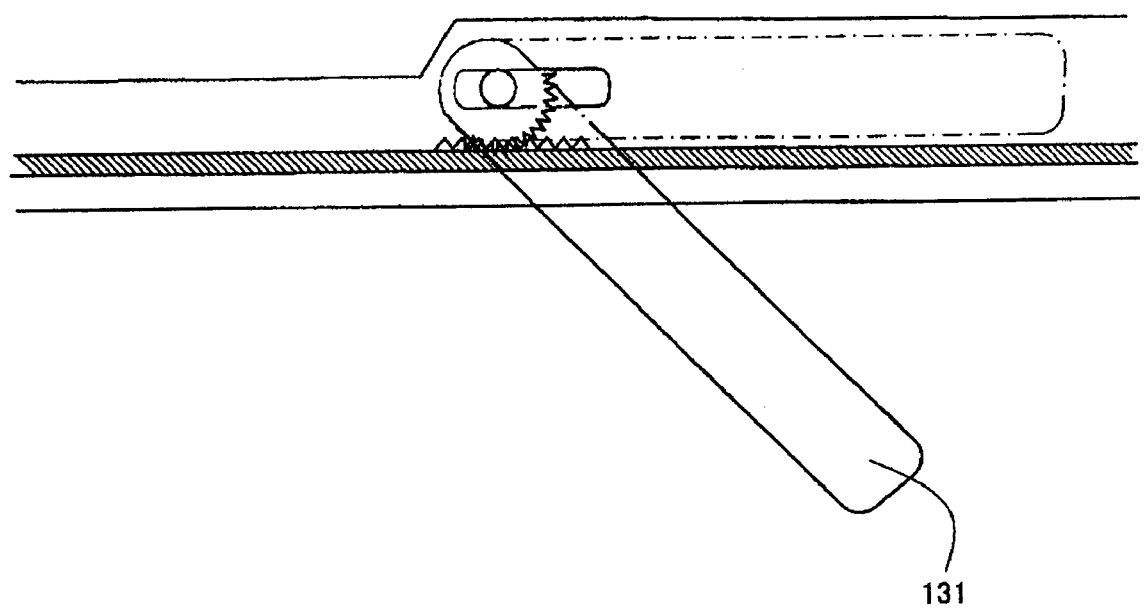
FIG. 8(e) is a plan view of the apparatus depicted in FIG. 4 and is an expanded view of a portion of FIG. 8(d).
Figure 9:
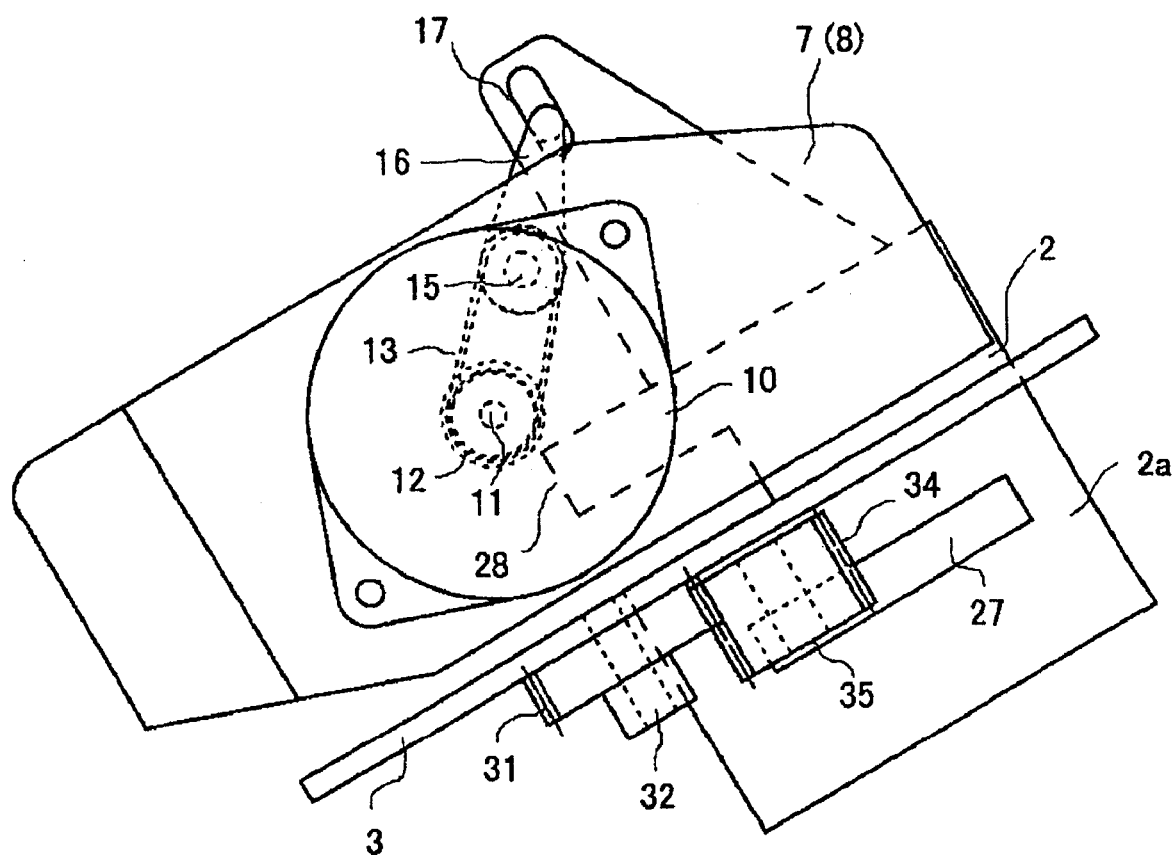
FIG. 9 is a side view of the auxiliary view A of the apparatus depicted in FIG. 8(a).

Note that the action of the lever members 131 is interlocked to the movement of the corner support means 3. The lever members 131 move from the operating position to the retracted position with the action of the corner support means 3. However, it is also possible to interlock this movement with the finishing unit 1. FIG. 8(c) shows the mechanism for interlocking the lever members 131 and the finishing unit 1. The lever members 131 are rotatably fastened to the outer frame 134 equipped with the rack 139, by the fastened pin 137 in the same way as described above. Therefore, when the finishing unit 1 moves back-and-forth, in other words between the operating position and the retracted position, the lever members 131 also move around the fastening pin 137 in the clockwise and counterclockwise directions. At this time, the lever members 131 rotate in a counterclockwise direction (in the direction of the arrow of the drawing) with the movement from the operating position to the retracted position, thereby pulling stacked sheets against the side edge reference surface 6.

According to this embodiment of the present invention, the movement of the lever members 131 is performed by the corner support means 3. Therefore, all of the drives for the stapler 2, the corner support means 3, the backward and forward movements of the aligning means 5 and the rotational drive for the aligning belt 50 are transmitted from a single drive motor. This dramatically reduces costs.

[Explanation of the Flow of Operations]

Initializing Operations

An operator turns the power of the printer on. At that time, a staple unit operation start signal is sent from the main unit to the finishing unit 1 (hereinafter referred to as the staple unit). When the staple unit 1 receives this signal, the drive motor 10 rotates in a forward direction (the motor rotates in the clockwise direction looking from the output shaft) as at an initialization operation. This causes the moving arm 16 interposed by the one-way clutch 16ow to move the stapler to the operating position by the urging force of the return springs 18 and 19 disposed between the unit frame 300 and the backside of the stapler 2, interposed by the arm engaging portion 17 matingly engaged in the long grooves of the engaging block 26 disposed above the stapler 2, for the amount of rotation of the drive shaft 15.

If the aligning means is not positioned at the retracted position when the staple unit operation starting signal is received, the solenoid 91 is energized causing the solenoid arm 90 to disengage from the engaging cam 99. This transmits the drive force of the drive motor 10 to return the aligning means 5 to the retracted position. At this time, the stapler 2 moves to the processing position by the urging force of the return springs 18 and 19 stretched between the unit frame 300 and the backside of the stapler 2. There, the corner support means 3 interlocked to the stapler 2, and the lever members 131 move to each processing position and idle.

When the stapler 2, the corner support means 3, and the lever members 131 touched the wall, etc., for positioning, their movements to each operating position are completed. Thereafter, while the drive motor 10 drives in the forward direction, the one-way clutch 16ow causes the drive shaft 15 to idle so there is no effect on the stapler 2, the corner support means 3, or the lever members 131.

Sheet Stack Alignment Operations

Aligning Preparations

Next, when the staple unit 1 receives the sheet discharge signal from the main unit, the solenoid 91 attracts the solenoid arm 90 to disengage it from the engaging cam 99 for a preset amount of time, as shown in FIG. 21. The cam urging lever 96 rotates the eccentric cam 92 in the counterclockwise direction. This rotation causes the leading end portion of the intermittent gear 67 to mesh with the intermediate transmission gear 66. The meshing of gears starts the rotation of the intermittent care 67, and starts rotating the crank arm 70, and the slider 60 moves to the left side of FIGS. 14 and 15.

This causes the belt drive shaft 48a rotatably supported on the slider 60 to move to the left side of the drawings. Along with that, the aligning means 5 also moves to the left side of the drawing. The engaging pin 56 mounted on the second bracket 54 passes over the changing flapper 85 moving to the left side of the drawing over the cam holding groove 84 of the camp groove 80 disposed on the side plate of the slider frame 8 on the stapler side. The engaging pin 56 of the aligning means 5 moves further to the left side over the cam inner wall 82. At the midpoint at the top of the slider 60, the aligning means 5 is positioned (sheet receiving position) above a sheet conveyed to the top of the corner support means 3 where the opening is the widest. The engaging pin 56 comes loose from the cam inner wall 82 and the aligning means 5 falls under their own weight thereby allowing the aligning means 5 to touch the top of the sheets on the corner support means 3. This position where the aligning means 5 falls is the aligning starting position of the aligning means 5.

At this position, in the engagement of the intermediate transmission gear 66 and the intermittent gear 67, the gears are at a position having no teeth on the intermittent gear 67 and thus become disengaged. At this time, the urging force from the cammed urging lever 96 acts on the cammed angle portion a93 of the eccentric cam 92 and the engaging cam 99 is stopped again by the solenoid arm 90. For that reason, the movement of the aligning means 5 is stopped, but the aligning belt 50 is configured to be able to rotatingly drive in a counterclockwise direction of the drawings. This makes it possible to set the aligning means at the position to pull sheets in the aligning reference direction while the movement to the front and back directions of the aligning means 5 is stopped.

Aligning Operations

The engaging cam 99 is engaged by the solenoid arm 90 thus the movements in the front and back directions of the aligning means 5 are stopped. In that state the aligning belt 50 rotatingly drives in a counterclockwise direction of the drawings for a predetermined amount of time thereby aligning an edge of a sheet against the side edge aligning surface 6.

Judging the Completion of Stacking of a Predetermined Number of Sheets

The system counts sheets to judge whether the predetermined set number of sheets have been stacked.

When the Stacking of a Predetermined Number of Sheets is not Completed

After the aligning operation by the aligning belt 50 for a predetermined amount of time, the solenoid 91 again attracts the solenoid arm 90 for a preset amount of time to disengage the solenoid arm 90 from the engaging cam 99. The cam urging lever 96 rotates the eccentric cam 92 in the counterclockwise direction causing the intermittent gear 67 to mesh and rotate with the intermediate transmission gear 66.

Along with this action, as shown in FIG. 19(*a*), the rotation of the crank arm 70 starts in the counterclockwise direction of the drawing. This rotation moves the slider 60 to the right side of the drawing, also moves the aligning means 5 to the right side of the drawing. The movement of the engaging pin 56 and the aligning means 5 raises the engaging pin 56 up the cam rising wall 83 from the cam lower surface groove 87 and pushes up the changing flapper 85 at the top edge of the cam rising wall 83. The engaging pin 56 moves further to the retracted (home) position shown in FIGS. 12 and 13 on the right side of the cam holding groove 84. This completes the preparation for receiving a next sheet. In this state, a next sheet can be conveyed in. When the sheet is conveyed in, the operations shown in FIGS. 12 to 19(*c*) are performed to align the sheet. This is repeated until the predetermined number of sheets has been stacked.

When the Stacking of a Predetermined Number of Sheets is Completed

If the system is in the stapling mode, the stapling motor is started. The aligning means aligns the edges of sheets against the side edge aligning surface 6 to perform the stapling operation while pressing on the sheet bundles with the weight of the aligning means. Thereafter, the solenoid 91 attracts the solenoid arm 90 for a preset amount of time. The same operations as those for when the stacking of a predetermined number of sheets has not been completed are continued. The aligning means 5 moves to the retracted (home) position shown in FIGS. 12 and 13.

When the aligning means 5 has completed the move to the retracted (home) position, and the drive motor 10 starts driving in the reverse direction, the drive from the drive motor 10 is transmitted to the drive shaft 15 and to the moving arm 16 interposed by the one-way clutch 16*ow*. The one-way clutch 16*ow* enables the transmission of drive force while the drive motor 10 is driving in the reverse direction (rotating in the counterclockwise direction looking from the output shaft). This rotates the arm engaging portion 17 at the leading end of the moving arm 16 that is matingly engaged in the long grooves of the engaging block 26 disposed on the top portion of the stapler 2 in the clockwise direction. This moves the stapler 2 to the retracted position on the right side of the drawings while charging the return springs 18 and 19 disposed at the unit frame 300 and the backside of the stapler 2. The corner support means 3 interlocked to the stapler 2, and the lever member 131 move to each retracted position (home positions). If the system is in a non-stapling mode, the same actions as the stapling mode are performed, except for the stapling operation.

Sheet Drop Stacking to the Sheet Stacker

A stacked sheet bundle drops into the stack tray 210 under its own weight by the movement of the stapler 2, the corner support means 3 and the lever members 131, described above, to each of their retracted positions (home positions) thereby completing a job. The system idles while waiting for a next job.

Thus, as described above, a sheet finishing apparatus of the present invention and an image forming apparatus equipped with the same advance and retract by a mechanism unit for finishing sheets after finishing a sheet bundles on the stacking tray. This allows for a smaller and more compact apparatus. This configuration allows for a more compact structure for advancing and retracting a support member for supporting sheets for finishing, and a finishing unit above a stacking tray, and allows for a simplified drive mechanism. At the same time, maintenance of the finishing unit is made easier. Furthermore, this provides a finishing apparatus that makes it possible for organizing and storing sheets in a stacking tray after finishing, and provides an image forming apparatus equipped with such mechanisms.

Note that the invention described herein claims priority rights from Japanese patent application No. 2004-230232, 2004-230233, 2004-230234, and 2004-230235 which have been filed before the Japanese patent office.

What is claimed is:

1. A sheet finishing apparatus comprising:
   a tray device arranged below a discharge outlet for sequentially stacking and storing a sheet;
   a corner support device arranged between the discharge outlet and the tray device for supporting a corner of the sheet;
   a finishing device for finishing the sheet on the corner support device;

a first support device for supporting the corner support device, said first support device moving the corner support device between an operating position positioned in a sheet conveying path from the discharge outlet to the tray device, and a retracted position retracted from the operating position, a second support device for supporting the finishing device, said second support device being formed separately from the first support device and moving the finishing device between an operating position positioned in the sheet conveying path to a retracted position retracted from the operating position;

a drive device for moving the first support device and the second support device from the operating positions to the retracted positions, respectively, after finishing the sheet with the finishing device, and an aligning device disposed on the corner support device, said aligning device being arranged to contact the corner of the sheet on the corner support device from above and to move the sheet toward the finishing device while aligning the sheet.

2. A sheet finishing apparatus according to claim 1, wherein the discharge outlet, the corner support device and the tray device are arranged vertically in different levels; and the corner support device and finishing device are movable between the operating positions and the retracted positions disposed on planes different from and substantially parallel to a level of the discharge outlet.

3. A sheet finishing apparatus according to claim 1, wherein the first support device has the operating position in a direction substantially orthogonal to the sheet discharge direction from the discharge outlet, and the retracted position.

4. A sheet finishing apparatus according to claim 1, wherein the corner support device is composed of a plate-shaped member for supporting the corner of the sheet;

the first support device is composed of a rotating shaft member that revolvingly supports the plate-shaped member;

the finishing device is composed of a stapling unit having staples; and the second support device is composed of guide rail members for movably supporting the stapling unit.

5. A sheet finishing apparatus according to claim 4, wherein the plate-shaped member is rotatably supported between the operating position that is on a plane substantially parallel and forming a level difference to a plane for the sheet discharged from the discharge outlet, and the stapling unit is movably supported in a straight line between the operating position that is on a plane substantially parallel and forming a level difference to the plane for the sheet discharged from the discharge outlet and the retracted position.

6. A sheet finishing apparatus according to claim 1, wherein the corner support device, the finishing device and the aligning device are linked to a single drive motor;

wherein the drive motor moves each of these devices to the operating positions and the retracted positions.

7. A sheet finishing apparatus according to claim 6, wherein the single drive motor is capable of both forward and reverse drives, moves the corner support device and the finishing device with a single direction drive, and moves aligning device with a drive in an opposite direction.

8. A sheet finishing apparatus according to claim 1, wherein the corner support device, the finishing device and the aligning device each have the retracted positions at a sheet width direction side portion at right angles to a sheet conveyance direction from the discharge outlet.

9. A sheet finishing apparatus according to claim 1, wherein an amount of movement between the operating position and the retracted position is larger for the corner support device compared to the finishing device and the aligning device.

10. A sheet finishing apparatus according to claim 1, wherein the corner support device, the finishing device and the aligning device are separate units to the tray device; and these units are each provided with unit frames that support a first support member for supporting the corner support device; a second support member for supporting the finishing device; and a third support member for supporting the aligning device.

11. An image forming apparatus comprising:

an image forming device for forming an image on a sheet;

a discharge outlet for discharging the sheet formed with the image by the image forming device;

a tray device arranged below the discharge outlet for sequentially stacking and storing the sheet;

a corner support device arranged between the discharge outlet and the tray device for supporting a corner of the sheet; support device;

a first support device for supporting the corner support device to be moveable between an operating position positioned in a conveying path of the sheet from the discharge outlet to the tray device, and a retracted position retracted from the operating position;

a second support device for supporting the finishing device, said second support device being formed separately from the first support device and moving the finishing device between an operating position positioned in the sheet conveying path and a retracted position retracted from the operating position;

a drive device for moving the first support device and the second support device from the operating positions to the retracted positions, respectively, after finishing the sheet with the finishing device, and an aligning device disposed on the corner support device, said aligning device being arranged to contact the corner of the sheet on the corner support device from above and to move the sheet toward the finishing device while aligning the sheet.

12. An image forming apparatus according to claim 11, further comprising a sheet edge support device arranged to form a level difference to the discharge outlet and the tray device, for supporting a trailing edge of the sheet conveyed from the discharge outlet;

wherein the sheet edge support device is movable between an operating position positioned above the tray and a retracted position retracted from the tray.

13. A sheet finishing apparatus comprising:

a tray device arranged below a discharge outlet and having a sheet side edge aligning surface and a trailing edge aligning surface;

a support device for supporting a portion of a sheet stacked on the tray device;

a drive device for driving the support device between an operating position positioned above the tray device and a retracted position retracted from the tray device; and a finishing device for finishing the sheet supported on the support device;

wherein the support device comprises a side edge support member disposed at a position forming a level difference between the discharge outlet and the tray device for supporting a side edge of the sheet, and a trailing edge support member for supporting a sheet trailing edge;

each of the side edge support member and the trailing edge
support member is movable between an operating position and a retracted position set within a plane substantially parallel to each other to form a level difference from the sheet on the tray and is supported to rotate substantially parallel to a discharge direction of the sheet; and the drive device is a single drive source for rotating the side edge support member and the trailing edge support member between the operating positions and the retracted positions.

14. A sheet finishing apparatus according to claim 13, wherein the operating positions and the retracted positions of the side edge support member and the trailing edge support member are set to a direction to press the sheet against the side edge and trail edge support members when moving from the operating positions to the retracted positions.

15. A sheet finishing apparatus according to claim 14, wherein the finishing device moves between an operating position positioned above the tray device and a retracted position retracted from the tray device; and the side edge supporting member and the trailing edge supporting member move to each operating position and retracted position by linking to a movement of the finishing device from the operating position to the retracted position.

16. A sheet finishing apparatus according to claim 15, wherein the finishing device, the side edge support member and the trailing edge support member are each set to an operating position to disengage from the sheet on the tray in the order of the finishing device, the trailing edge support member, and then the side edge support member when moving from the operating positions to the retracted positions.

17. A sheet finishing apparatus according to claim 13, wherein the side edge support member and the trailing edge support member rotatably support a plate-shaped tray member;

the trailing edge support member is linked to rotate by a rotating movement of the side edge support member; and the trailing edge support member is set to a direction for rotating from the operating position to the retracted position to press the sheet against the side edge aligning surface side.

18. A sheet finishing apparatus according to claim 13, wherein the side edge support member and the trailing edge support member rotatably support a plate-shaped tray member;

the finishing device is movably supported between the operating position positioned above the tray member and the retracted position retracted from the tray member;

the trailing edge support member is linked to rotate by a rotating movement of the finishing device; and the trailing edge support member is set to a direction for rotating from the operating position to the retracted position to press the sheet against the side edge aligning surface side.

19. An image forming apparatus comprising:

an image forming device for forming an image on a sheet;

a feeding unit for feeding a sheet to the image forming device;

a discharge outlet for discharging the sheet formed with the image by the image forming device;

a tray arranged below the discharge outlet having a sheet side edge aligning surface and a trailing edge aligning surface;

a support device for supporting a portion of the sheet stacked on the tray;

a drive device for driving the support device between an operating position positioned above the tray and a retracted position retracted from the tray;

a finishing device for finishing the sheet supported on the support device;

wherein the support device comprises a side edge support member disposed at a position forming a level difference between the discharge outlet and the tray for supporting a side edge of the sheet, and a trailing edge support member for supporting a sheet trailing edge;

each of the side edge support member and the trailing edge support member is movable between an operating position and a retracted position set within a plane substantially parallel to each other to form a level difference from the sheet on the tray and is supported to rotate substantially parallel to a discharge direction of the sheet; and the drive device is a single drive source for rotating the side edge support member and the trailing edge support member between the operating position and the retracted position.

\* \* \* \* \*